(12) United States Patent
Byerley

(10) Patent No.: US 6,457,505 B1
(45) Date of Patent: Oct. 1, 2002

(54) VEHICLE TIRE BUILDING DRUM INCLUDING BEAD DRUM POSITIONING AND SIDE WALL FORMATION FEATURES

(75) Inventor: Mark S. Byerley, Greenback, TN (US)

(73) Assignee: WYKO, Inc., Greenback, TN (US)

( * ) Notice: Subject to any disclaimer, the term of this patent is extended or adjusted under 35 U.S.C. 154(b) by 57 days.

(21) Appl. No.: 09/714,329

(22) Filed: Nov. 16, 2000

(51) Int. Cl.⁷ .............................................. B29D 30/24

(52) U.S. Cl. ..................... 156/415; 156/136; 156/417; 156/398

(58) Field of Search ................................ 156/398, 400, 156/401, 403, 414, 415, 417, 131, 133, 132, 135

(56) References Cited

U.S. PATENT DOCUMENTS

| | | | | |
|---|---|---|---|---|
| 3,598,673 A | * | 8/1971 | Caretta | 156/132 |
| 3,784,426 A | * | 1/1974 | Woodhall et al. | 156/132 |
| 4,131,500 A | * | 12/1978 | Wilde et al. | 156/131 |
| 4,239,579 A | * | 12/1980 | Felten et al. | 156/401 |
| 5,354,405 A | | 10/1994 | Byerley | |
| 5,505,803 A | | 4/1996 | Byerley | |
| 5,618,374 A | | 4/1997 | Byerley | |

* cited by examiner

Primary Examiner—Geoffrey L. Knable
(74) Attorney, Agent, or Firm—Pitts & Brittian, P.C.

(57) ABSTRACT

A drum for the formation of a vehicle tire carcass including bead positioning features, the drum including multiple subsystems which are operatively and cooperatively interconnected to enhance the definition of embryonic sidewalls of the tire.

17 Claims, 18 Drawing Sheets

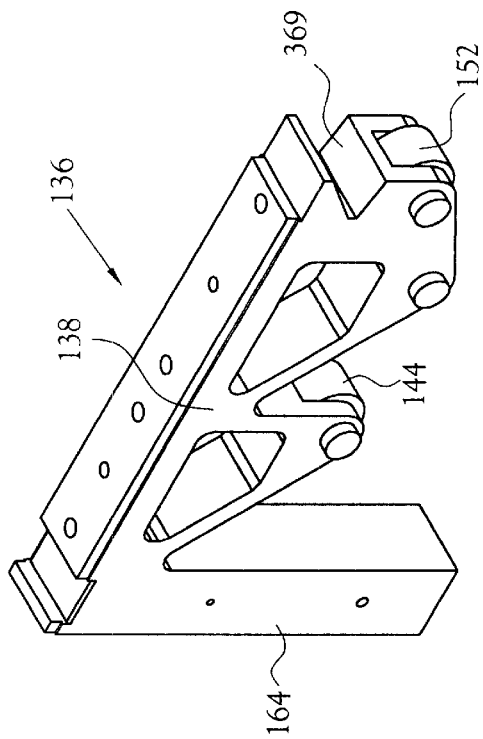
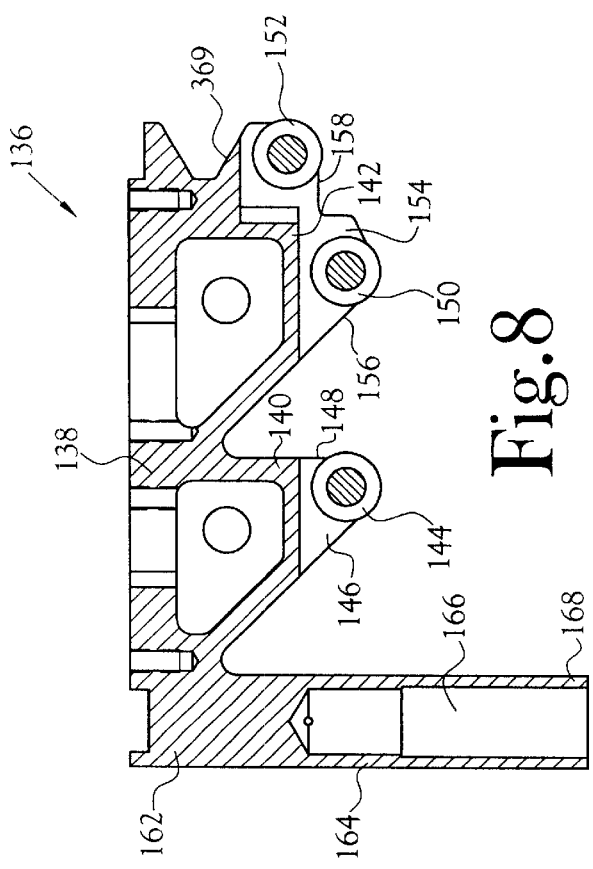
Fig.9
Fig.8

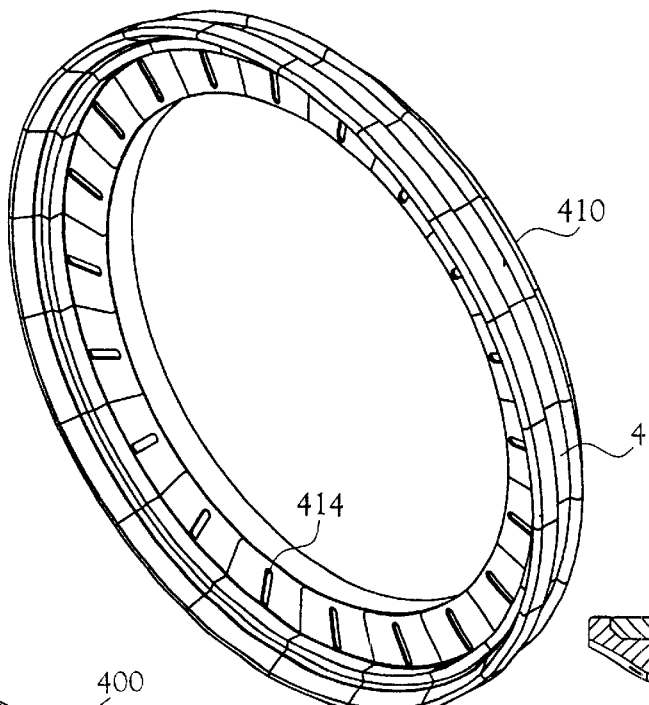
Fig. 38
Fig. 37
Fig. 35
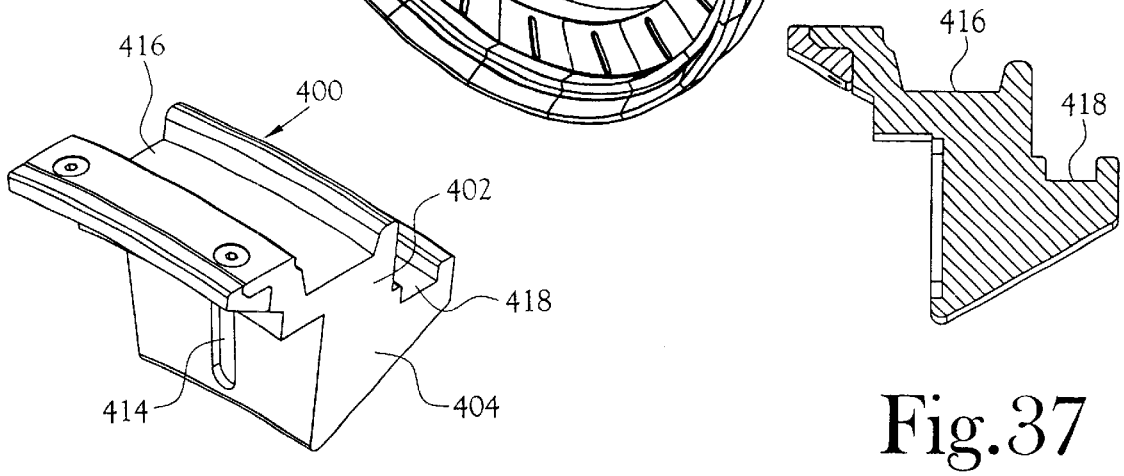
Fig. 36
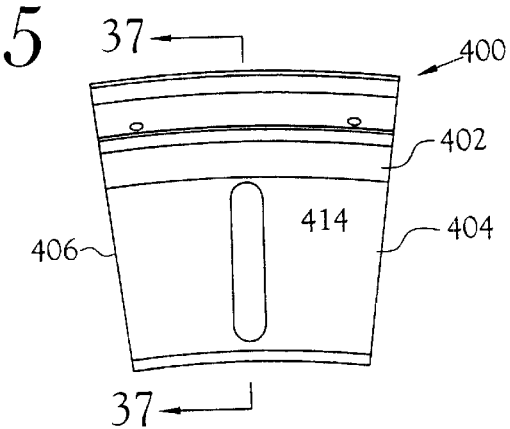

VEHICLE TIRE BUILDING DRUM INCLUDING BEAD DRUM POSITIONING AND SIDE WALL FORMATION FEATURES

FIELD OF INVENTION

This invention relates to apparatus and methods for the manufacture of vehicle tires, and particularly to a vehicle tire-making drum having unique bead positioning, side wall formation and other features.

BACKGROUND OF INVENTION

In the manufacture of vehicle tires it is common practice to lay up a carcass from layers of various fabrics on a rotating drum. It is also common in the industry to employ a drum in which the outer circumference (diameter) of the drum is adjustable, within limits, in preparation of the drum for receipt of the fabrics, for manipulation of the diameter of the drum in the course of formation of the carcass on the drum, for removal of the formed toroidal carcass from the drum, and/or for allowing a single drum to be employed for the manufacture of different diameter tires.

Most all vehicle tires include a pair of non-extensible bead rings which serve to define, in part, the internal diameter of the finished tire. Thus, the bead of a tire is that portion of the tire immediately adjacent the internal diametral region of the tire, and which is received by one side of the wheel rim of a vehicle. Each tire has two beads, one on each of the opposite sides of the tire. Bead rings commonly comprise a bundle of individual non-extensible metal rings or strands, similar to a metal cable.

Incorporation of the bead rings into a tire carcass has long been a troublesome aspect of a tire manufacturing process. Further, this operation is one of the more important operations in the process of manufacturing a vehicle tire in that the initial positioning of the bead rings of a tire establish that structural feature of a tire which is most critical to the success of the ultimately formed tire. That is, the bead rings must be initially positioned concentric to the rotational axis of the drum, must be disposed in respective essentially parallel spaced apart planes, such planes being oriented substantially perpendicular to the rotational axis of the drum. In achieving this initial disposition of the beads on a carcass formed on a rotatable drum, it is further necessary that the bead rings be secured (ie., bonded) to or within the carcass such that when the carcass is removed from the drum, the beads retain their initial orientation with respect to one another and to the carcass itself.

In the manufacture of radial and/or biased vehicle tires, in particular, securing the bead rings within the carcass requires that several factors be taken into consideration. First, after the body of the carcass is laid up on the drum, a bead ring is moved into encircling relationship to each of the opposite ends of the formed carcass. Once thus positioned, the drum is activated to "lock" each bead ring in its encircling position about the carcass. This normally takes the form of radially expanding one or more components of the drum at each end of the drum to capture an end of the carcass between the expanding component(s) and a respective bead ring. This action sets the position of the bead rings relative to the rotational axis of the drum and relative to the then-existing axial positions of the bead rings relative to the drum. Employing the same drum, the carcass is expanded in the region thereof between the bead rings to at least partially define its desired toroidal shape. This action stretches the carcass, especially at its opposite ends where the bead rings are located. To accommodate the radial expansion of the carcass, the bead rings, which are initially axially outboard of the ends of the drum must be moved axially inwardly of the drum. Recalling that the locking of the bead rings to the drum results in capture of the carcass between the locking mechanism and the bead rings, under these conditions. there can be no sliding or other repositioning movement of the carcass relative to the bead rings, ie., they are locked together. In order to capture each bead ring within the carcass such that there is no relative movement between the bead rings and the carcass after the bead locks have been released and the carcass is removed from the drum, a portion of the carcass which projects axially outboard of the location of a bead ring is folded radially upwardly and axially inwardly of the drum to wrap the bead ring and then overlie the carcass where this annular flap is bonded to the central body of the carcass to thereby capture the bead ring in the fold so formed.

In the prior art apparatus and methods, relatively complex and costly apparatus (and accompanying process steps) must be taken to precisely move the bead rings axially inwardly of the drum as the carcass is radially expanded. In like manner, the apparatus and process steps employed heretofore for wrapping the outboard ends of the carcass about the bead rings and into overlying relationship to the central body portion of the carcass have involved complex apparatus and process procedures, all of which must preclude the wrinkling of the carcass as the locked bead ring (with the carcass locked and bonded in partial wrapping relationship to only the inner circumference of each bead ring , hence non-positionable relative the each bead ring) is moved axially inwardly of the drum as the carcass is expanded radially. Heretofore, these combined movements of the radial expansion of the carcass and axially inward movement of the bead rings have been basically accomplished by means of two (or more) independently-controlled subsystems of the drum. Thus, control over the bending and stretching of the carcass at the outboard ends of the drum has been lacking, as has been the ability to ensure non-wrinkling of the carcass as the locked bead rings and that portion of the carcass which is locked to the bead rings, thereby resulting in undesirable rejection rates of completed vehicle tires.

Desirably, in the formation of certain vehicle tires on a drum, after the carcass has been formed with at least partial sidewalls and beads, a further fabric is overlaid upon the carcass on the drum, commonly as a part of each sidewall. This procedure of first folding each end of the partially formed carcass is "up" (i.e., radially outwardly) from the drum to overwrap the bead rings and into overlying relationship to the carcass on the drum, and thereafter, applying an additional layer of fabric on the carcass and folding each end of this additional layer "down" and about the bead rings and the formed sidewalls is commonly referred to as "one up one down". The bonding of the downwardly folded ends of the additional layer to the axially outward surface of a respective sidewall is commonly carried out by means of a stitching wheel which serves to bond the added fabric to the first fabric of the sidewall. In the manufacture of these tires, to provide access to the outer surfaces of the sidewalls for stitching and/or other purposes, it is required that the bead locking subassembly of the drum be moved axially outwardly of the drum to provide an open space for the stitcher to enter and function. To successfully perform this operation, the expanded central portion of the carcass must remain expanded during this operation. Ensuring that the central portion of the drum with the partially formed carcass thereon does not collapse radially as the bead lock subassemblies release their locking of the bead rings and are moved axially away from the central portion of the drum to permit a stitching operation, has been accomplished in the prior art through the use of extensive mechanical mechanisms, some of which occupy inordinate volume of the interior of the drum and thereby limit the permissible radial expansion range of the drum.

It is therefore an object of the present invention to provide an improved drum for use in the manufacture of vehicle tires.

It is another object of the present invention to provide a method for the formation of a vehicle tire employing a rotatable drum.

BRIEF DESCRIPTION OF THE FIGURES

FIG. 8 is a sectional side elevation view of a segment carrier as employed in a drum of the present invention;

FIG. 9 is a perspective view of the segment carrier depicted in FIG. 8;

FIG. 35 is a perspective view of a bead lock shoe as employed in the present invention;

FIG. 36 is a side elevation view of the bead lock shoe depicted in FIG. 25;

FIG. 37 is a sectional view of the bead lock shoe depicted in FIG. 36 taken generally along line 37—37 of FIG. 36; and FIG. 38 is a perspective view of a plurality of bead lock shoes assembled into an annular bead lock ring.

SUMMARY OF THE INVENTION

Figure 1:
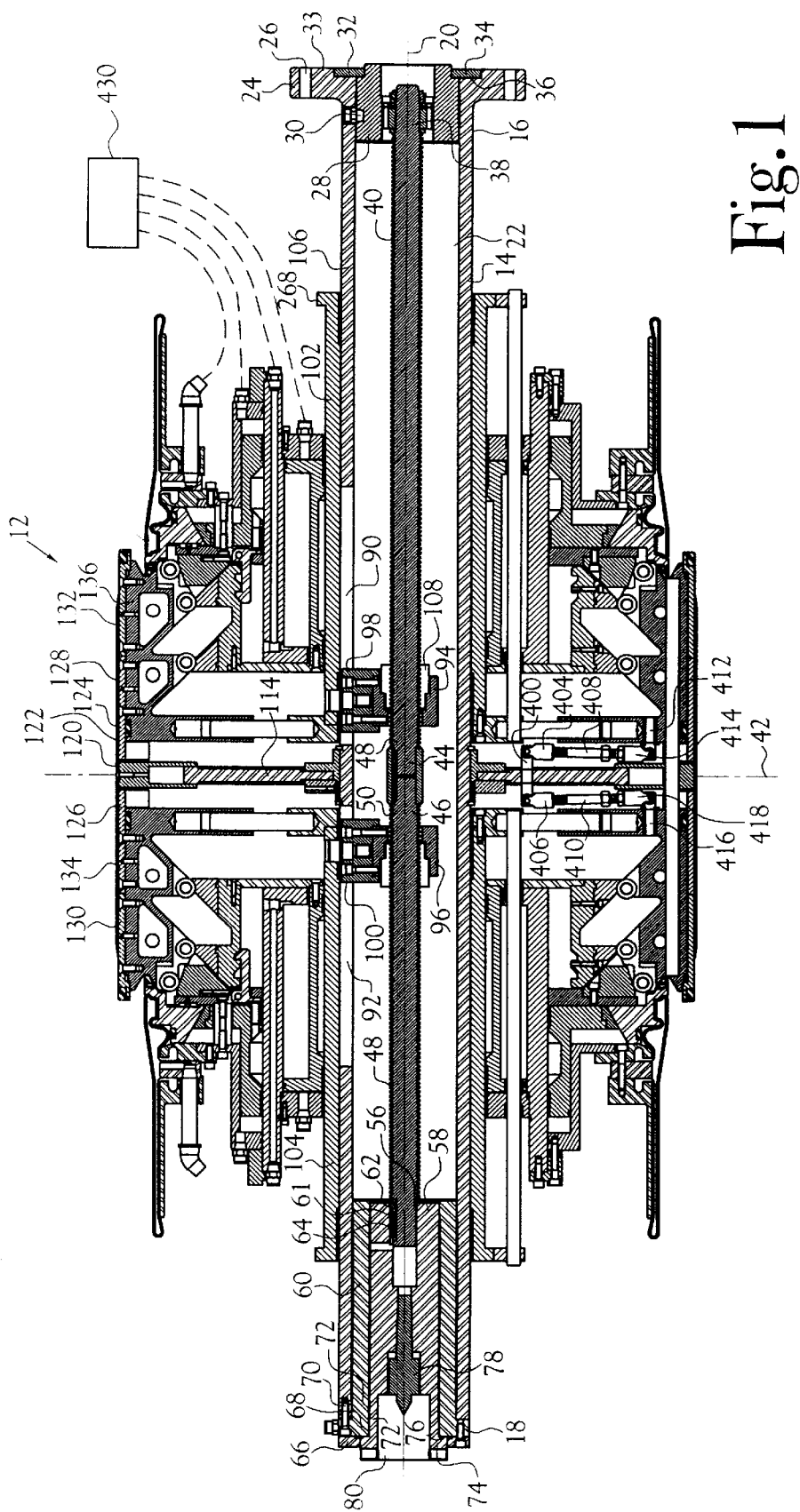
FIG. 1 is a cutaway side elevation view of one embodiment of a drum which incorporates various of the features of the present invention.

The present invention includes an improved vehicle tire-making drum which includes multiple subsystems which act in concert to provide enhanced placement and capture of bead rings in encircling relationship adjacent the opposite ends of a partially formed vehicle tire carcass on a rotatable, radially-expansible drum, followed by radial expansion of the central body portion of the carcass and simultaneous axial repositioning of the bead rings and the end portions of the carcass fabric to initially define the sidewall and beads of the vehicle tire. This initially formed carcass with its embryonic sidewalls is "locked" in its expanded condition and with its sidewalls extending radially inwardly from the carcass. Thereafter, the bead locking mechanism is axially withdrawn to expose the sidewalls for further tire-building activity thereupon. Further thereafter, the drum is radially collapsed by an amount sufficient for the removal of the formed carcass from the drum.

DETAILED DESCRIPTION OF INVENTION

Referring specifically to FIGS. 3a–3f first and second end subsystems 13, 13' at each of the opposite ends of the drum provide for initially locking a respective bead ring to each of the opposite ends of a partially formed carcass disposed on the drum (see FIG. 2), including a plurality of bead lock shoes disposed circumferentially about the drum and mounted for radial reciprocatory movement thereof in response to an axially applied force, to thereby effect locking of each bead ring to its respective end of the carcass. Inward radial movement of these shoes is in response to a radially applied force, such as by the contractive force of an encircling elastic band. Each of these end subsystems is axially separable from a central third subsystem 15 to provide working space therebetween (see FIG. 3b).

Within the central third subsystem there is included a subassembly which provides for selective radial expansion and collapse of the drum circumference. Radial expansion of the drum serves to radially expand that portion of the carcass which is intermediate the locked bead rings, between maximum and minimum limits to develop an initial desired circumference for forming a carcass of a given size, and to collapse the drum sufficiently to permit the removal of a formed carcass therefrom. In the present invention, radial expansion of the carcass is coordinated and controlled with axially inward movement of the locked bead rings (relative axial movement between the first, second and central third subsystems) such that each of the circumferential rims at each of the opposite ends of the expanding drum follows a respective controlled, generally curved, path from respective positions wherein the rims and the bead rings are adjacent to one another and substantially equidistant radially of the drum, to respective positions wherein the rims of the drum are disposed more radially outward of the drum and the bead rings are disposed more axially inward of the drum with respect to their initial positions. The effective result of these coordinated and controlled movements is to reposition the bead rings relative to the central portion of the carcass to thereby define embryonic sidewalls and beads of the tire.

Also within the third subsystem there is provided a further subassembly for axial movement of the opposite first and second end subsystems of the drum away from or toward the transverse center plane of the drum for initially axially positioning all the components of the drum for receipt of an initial carcass and the bead rings, and for subsequently withdrawing the end subsystems from the central section of the drum to provide open space between each of the end subsystems and the respective adjacent ends of the central subsystem of the drum to provide space for allowing additional work upon the sidewalls and beads of the carcass. The working and structural interrelationships of this further subassembly with the first and second subsystems is such as provides for "locking" of the drum circumference in its expanded condition during the time when work is being performed on the sidewalls and beads, and for release of this "locked" condition when it is desired to collapse the drum and remove the carcass therefrom.

A fourth subsystem including a central shaft and associated components provides for selection of the width of the drum and further provides for mounting and/or interconnection of various of the subsystems and/or subassemblies, either directly or indirectly, to a main shaft whose rotation provides for rotation of the drum about its rotational axis. As noted, certain of the subsystems and/or subassemblies are interrelated with respect to their respective movements.

Effectively, the drum of the present invention is divided into halves, which are substantially mirror images of one another about a transverse center plane that is perpendicular to the rotational axis of the drum, and which, in the absence of some correcting mechanism, can rotate generally independently of each other about the rotational axis of the drum. In accordance with one aspect of the present invention, there is provided a novel means for interlocking the two halves of the drum for coordinated movement of the two halves as their respective circumferential surface-defining segments are moved radially inwardly and outwardly of the drum to alter its outer diameter during various operations of the drum and/or when adjusting the width of the drum between different tire sizes.

Various means are provided for ensuring continued alignment of various of the components of the drum and for adjusting, as needed, the relative positions of various of the components of the drum to other components of the drum during assembly of the drum and/or in the course of its operational life.

Figure 2:
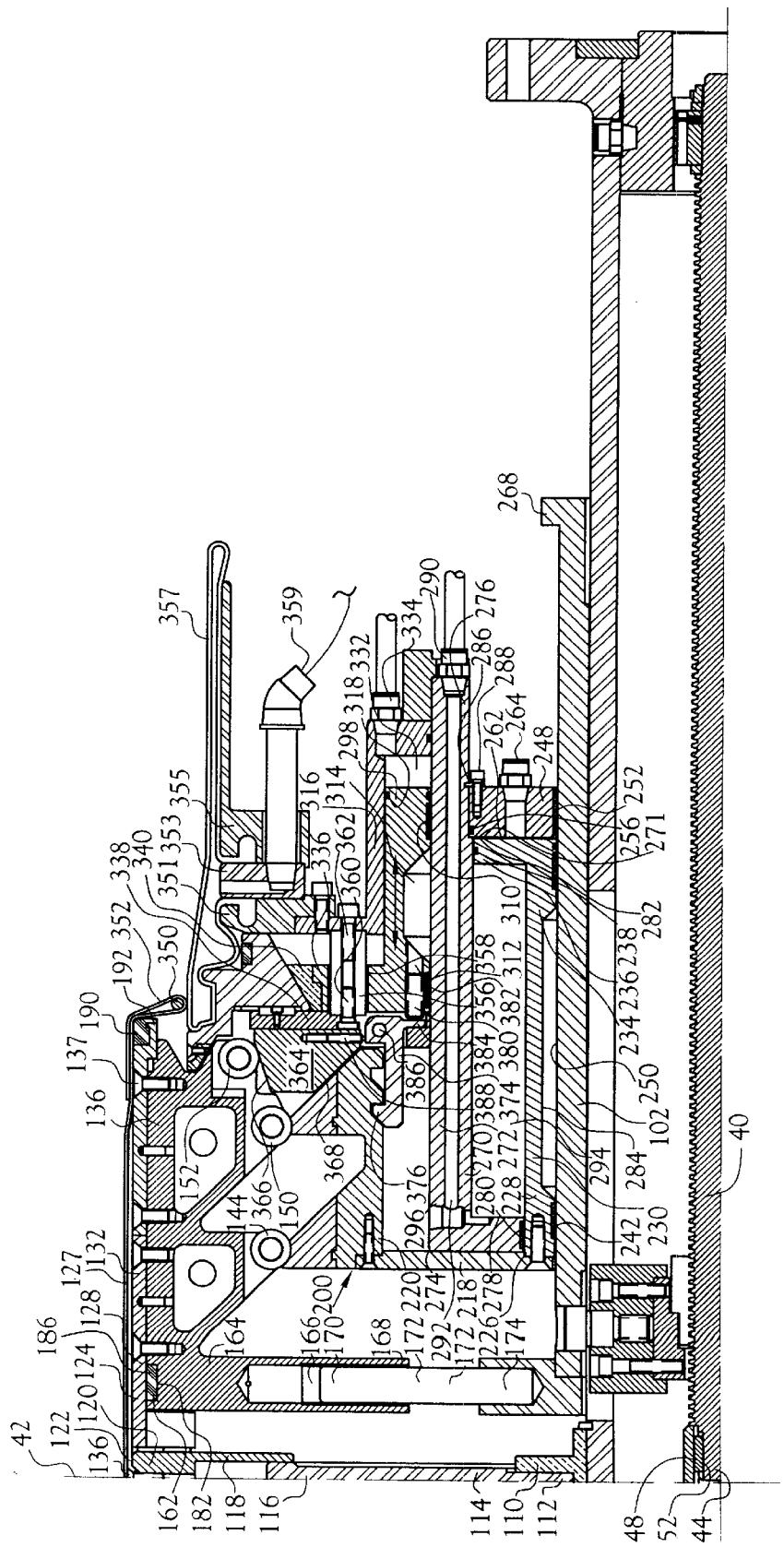
FIG. 2 is an enlarged view of the upper right hand quadrant of FIG. 1.
Figure 3A:
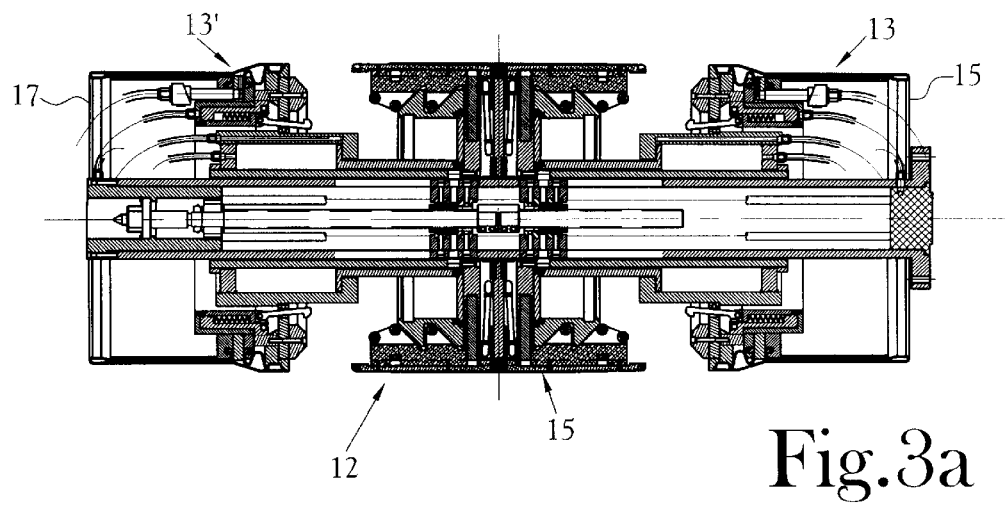
FIGS. 3A through 3F depict a cutaway side elevation of one embodiment of a drum of the present invention and show a cycling sequence of the drum.
Figure 3B:
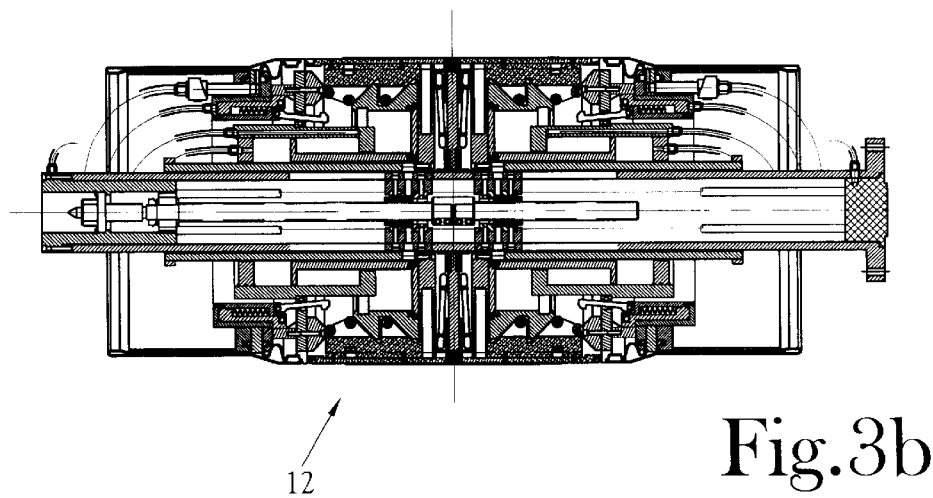
Figure 3C:
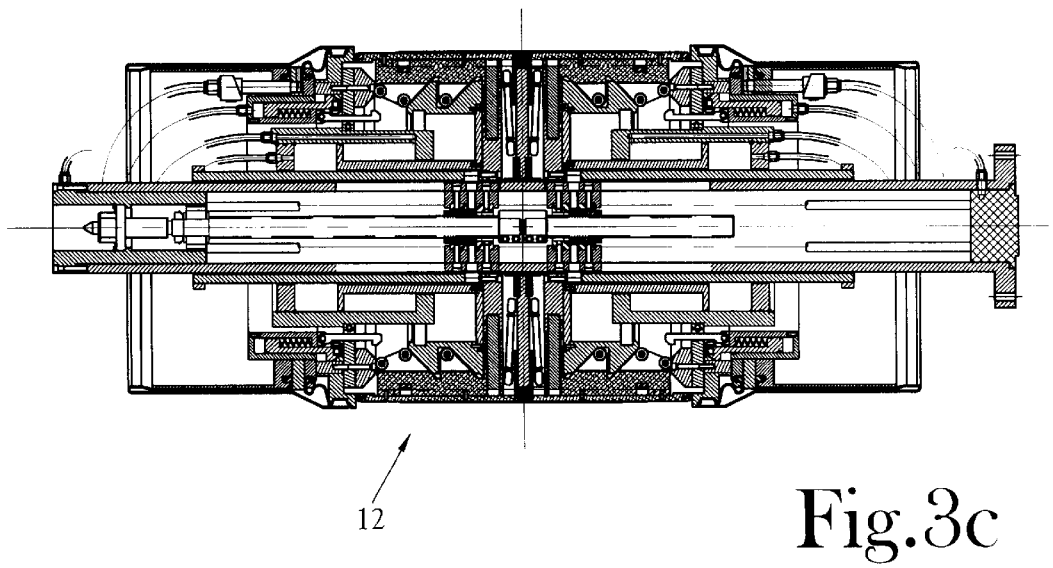
Figure 3D:
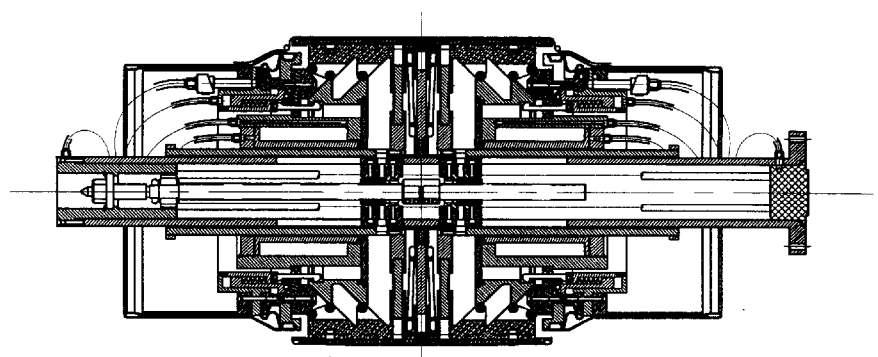
Figure 3E:
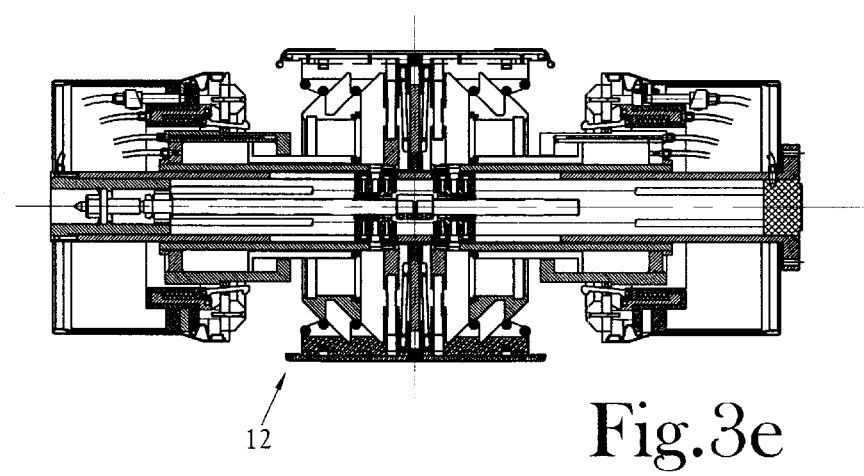
Figure 3F:
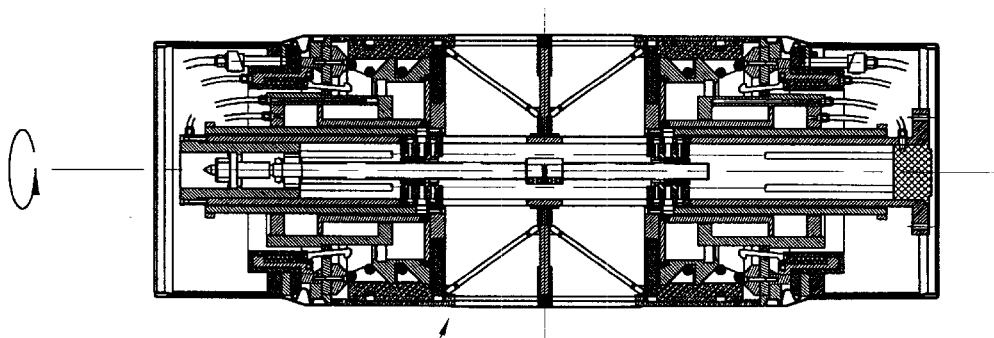

With reference to the several Figures, and initially to FIGS. 1 and 2 (it is to be noted that FIG. 1 is not a true section in that portions of the upper half and the lower half have been omitted or added to better depict the drum of this invention, and FIG. 2 generally represents the top right hand quadrant of FIG. 1), one embodiment of the bead lock drum 12 of the present invention includes a central drive shaft 14 having opposite ends 16,18, one end 16 of which is adapted to mount the shaft, hence the drum, to a conventional tire making machine (not shown) which provides power for rotation of the drum about its rotational axis 20. The depicted shaft is of a cylindrical geometry having an open central bore 22 within which there are received certain components of the drum. That end 16 of the shaft which connects the drum to the tire making machine includes a radial flange 24 that includes throughbores 26 (typical) for the receipt of bolts or the like (not shown) for attachment of the flange, hence the shaft, to the tire making machine.

Internally of the hollow drive shaft 14 and adjacent that end 16 thereof which is attached to the tire making machine, there is provided a cylindrical bearing 28 which is locked in position at the end of the shaft 14 as by means of a set screw 30 and by a stop ring 32 which is attached to the outboard end 16 of the shaft and which projects radially inwardly of the shaft to be engaged by circumferential shoulders 34,36 on the bearing and shaft respectively. This cylindrical bearing is hollow and rotatably receives therein one end 38 of an externally threaded solid shaft 40 which extends from the end 16 of the drive shaft 14 to a location adjacent, but short of, the transverse center plane 42 of the drum. In the depicted embodiment, the inboard end 44 of the threaded shaft 40 is adjacent, but spaced apart from, the inboard end 46 of a further solid externally threaded shaft 48 which extends from proximate the transverse central plane of the drum to the opposite end 18 of the drive shaft. At the transverse central plane of the drum, the two inboard ends 44,46 of the first and further solid shafts are drivingly interconnected as by means of respective elongated keys 49,50 which are received in respective keyways 52,54 provided in the outer surfaces of the adjacent 44,46 ends of the shafts 40,48. The opposite end 56 of the further solid shaft 48 is received within a first hollow, generally cylindrical bearing member 58 that is rotatably received within a still further cylindrical bearing member 60 that is fixedly mounted in the open inboard end 18 of the drive shaft 14 as by set screws (not shown). In this embodiment, the outboard end 56 of the further solid shaft 48 is keyed to the first bearing member as by a key 61 received in a keyway 62 provided in the outer surface of the solid shaft 48 and a keyway 64 provided in the inner surface of the first bearing member 58. The further bearing member 60 is held rotatably within the main shaft as by bolts 70 which extend through the thickness of a radial flange 72 provided on the outboard end 71 of the further bearing member 60. The outboard end of the first bearing member 58 is provided with a radial flange 74 which frictionally engages the outboard end 76 of the further bearing member 60. A circular pressure plate 79 is mounted on the radial flanges 74 of the further bearing member 60. Internally of the first bearing member there is provided an axially aligned drive member 78 which is adapted to drivingly rotate the first bearing member 58, hence rotate the centrally connected first and further solid threaded shafts 40,48 relative to the drive shaft 14 as by means of a tool (not shown) which is insertable into the open outboard end 80 of the first bearing member 58 to engage the drive member for bidirectional rotation thereof.

The drive shaft 14 is provided with first and second open elongated slots 90,92 through the wall thickness thereof at locations on opposite sides of, and adjacent to, the transverse center plane of the drum. Within the drive shaft, and operatively disposed with respect to each of the slots, there are provided internally threaded collars 94,96 which encircle a respective threaded portion of one of the solid shafts and includes at least one leg member 98,100 projecting through a respective slot 90,92 in the shaft wall to be operatively connected to respective tubular slide members 102,104 which in turn are slidably mounted on the outer circumference 106 of the drive shaft 14. Movement of each collar member along its respective solid shaft that is disposed internally of the drive shaft serves to alter the location of the slide member along the length of the drive shaft. To this end, each collar member includes an internally threaded drive nut 108 which encircles a respective solid shaft. This drive nut is fixedly mounted to the collar member so that the drive nut is precluded from rotating relative to its solid shaft. Thus, upon rotation of the solid shaft, the drive nut moves axially of the solid shaft and carries with it its collar member, which in turn serves to alter the position of its respective slide member along the length of the drive shaft. On the opposite side of the transverse center plane of the drum, and disposed within the hollow drive shaft, the further collar member 96 is of like construction to the first collar member and serves the like purpose of adjusting the position of its respective slide member along the length of the drive shaft.

The first and further collars 94,96 serve to fix the positions of their respective slide members 102,104 along the length of the drive shaft to selectively alter the respective positions of the slide members along the length of the shaft as desired for adjusting the width of the drum as needed for different size tires. To this end, the first solid shaft 40 has threads of a first hand and the further solid shaft 48 has threads of the opposite hand so that upon simultaneous rotation of the solid shafts, the slides both move the same axial distance, but in opposite axial directions. Initial positioning of the collars along their respective solid shafts at assembly of the drum determines the initial positioning of their respective slides relative to one another.

At the transverse central plane 42 of the drum there is mounted on the main shaft 14 of the drum, a U-shaped cylindrical bracket 110 which opens radially outwardly from the drive shaft. Referring to FIGS. 1 and 2, the inner circumferential margin 112 of a timing plate 114 is slidably mounted within the bracket 110 so that this plate may rotate relative to the drive shaft. The outer circumferential margin 116 of the timing plate 114 is slidably received within a plurality of U-shaped gap shield brackets 118 which open inwardly of the drum, the radially outwardly disposed body portion 120 of each gap shield bracket having attached thereto one of a plurality of gap shields 122. Each gap shield overlies respective inboard end portions 124,126 of a pair of the segments 128,130 which collectively define the outer circumference of the drum. These segments and gap shields, and their functions, are well known in the art. This further U-shaped bracket 118 is of a depth which permits the outer circumferential margin 116 of the timing plate 114 to slide radially within the bracket 118 by a distance sufficient to permit the desired radial movement of its associated gap shield during expansion and/or retraction of the diameter of the drum.

As noted and as depicted in FIGS. 1 and 2, the outer circumference 127 of the drum is collectively defined by a plurality of elongated, relatively narrow, segments 128,130 for example, each of which includes an outer arcuate surface 132,134. In the depicted embodiment of the present drum, each half of the drum includes its own plurality of segments, each such segment extending parallel with its adjacent segments, from proximate the center transverse plane of the drum axially to the outboard rim of the drum. Each segment is mounted for radial movement relative to the rotational axis 20 of the drum. In the present embodiment, each segment is removably attached to a segment carrier 136 as by screws 137 or the like (see FIG. 2). There is provided one carrier 136 per segment and each carrier includes a generally planar body portion 138 thereof which is oriented within a radial plane of the drum.

With reference to FIGS. 8 and 9, a typical segment-mounting carrier 136 includes the aforementioned planar body portion 138, and first and second cam supports 140 and 142 which project from the body portion radially inwardly of the drum. As also noted, each carrier is oriented within a radial plane of the drum. The first cam support 140 receives thereon a first roller cam 144 received in an open slot 146 located at the outboard end 148 of the first cam support. The second cam support 142 receives thereon second and third roller cams 150,152 which also are journalled within a further open slot 154 in the second cam support 142. The second roller cam 150 is mounted at the outboard end 156 of the second cam support and the third roller cam 152 is journalled at the radially inward and axially outwardly disposed corner 158 of the second cam support 142.

Adjacent the inboard end 162 of the planar body portion 138 of the carrier 136 there is provided a leg 164 which projects from the inboard end of the planar body portion in a direction radially of the drum and toward the drive shaft. This leg 164 is provided with a central bore 166 which opens outward of the radially inward end 168 of the leg. Within this open end of the leg there is slidably received the radially outboard end 170 of a connector rod 172. (See also FIGS. 1,2 and 10–11). In the present embodiment, each segment-mounting carrier 136 receives one such connector rod. As depicted in FIGS. 1–2 and 10–11 collectively, the radially inboard ends 174 (typical) of the plurality of connector rods 172 (typical) are securely mounted in respective bores 176 (typical) which open radially outwardly from the outer circumference 178 of a radial flange 180. This radial flange is securely mounted on its respective one of each of the first and further slide members 102,104. By this means, the segment-mounting carriers 136 are free to move in a direction radially inwardly or outwardly of the drum relative to the rotational axis of the drum and to be moved axially with axial movement of their slide members 102,104. Each carrier 136 is provided with an open groove 182 adjacent the axially inboard end 162 of the carrier for their receipt therein of a resilient band 186 (see FIG. 2) which is employed as a retainer for the segment-mounting carriers on their respective connector rods, and to bias all the cam supports radially inwardly of the drum. In the depicted embodiment, the several segment members are assembled on their respective carriers and thereafter held in their assembled positions by means of the resilient band 186 which encircles the plurality of carriers, preferably at a location proximate the transverse center plane of the drum. As seen in FIG. 2, a further resilient band 190 is provided in encircling relationship to the assembled segments at a location adjacent the outboard ends 192 of the respective segments. As will be noted hereinafter, this further band serves other purposes in the present invention.

Figure 12:
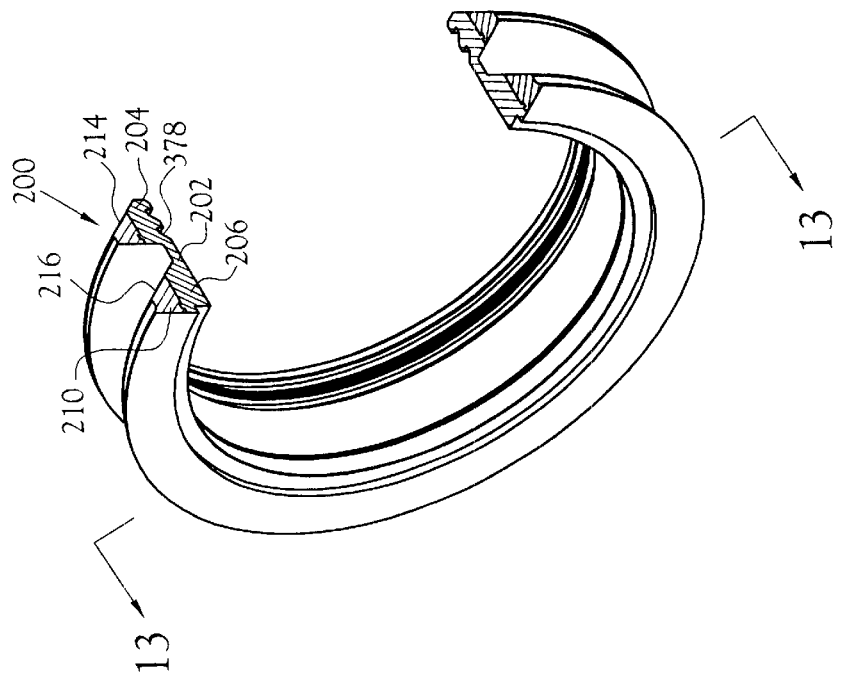
FIG. 12 is a partial perspective view of an annular ramp as employed in a drum of the present invention.
Figure 13:
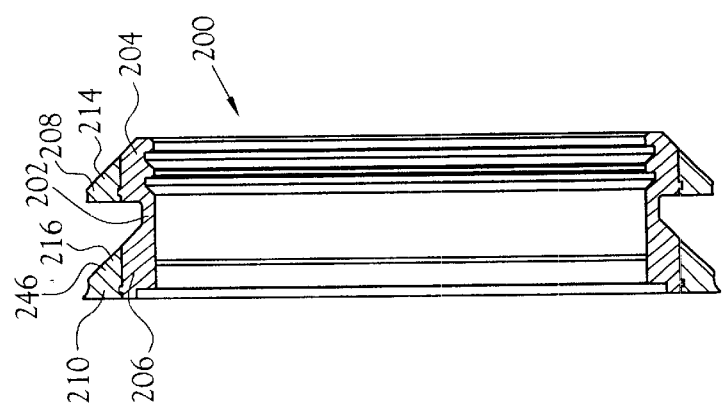
FIG. 13 is a section view of the annular ramp depicted in FIG. 12 and taken generally along the line 13—13 of FIG. 12.

As depicted in FIG. 1, the plurality of segment carriers are disposed adjacent the outer circumference of the drum. As also depicted in FIG. 1, and further depicted in FIGS. 12 and 13, an annular ramp member 200 is mounted internally of the drum and in operative relationship to the plurality of segment carriers. Specifically, referring to FIGS. 12 and 13, one embodiment of the annular ramp member 200 includes an annular body portion 202 having first and second annular side edges 204,206. Along each annular side edge 204 and 206 respectively, there is provided an annular projection 208 and 210, respectively, that extends around the outer circumference of the ramp and projects from the body portion 202 thereof radially toward the outer circumference of the drum. Each projection includes a cam surface 214,216 along its axially outboard side, whereby each cam surface 214,216 is positioned operatively with a respective one of the roller cams 144,150 mounted on their respective cam support 140,142 of the segment carrier.

Figure 20:
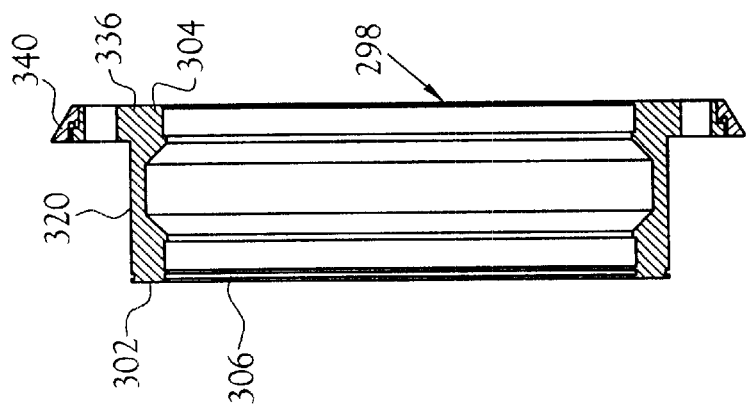
FIG. 20 is a sectional view of the bead lock piston depicted in FIG. 19 and taken generally along line 20—20 of FIG. 19.
Figure 22:
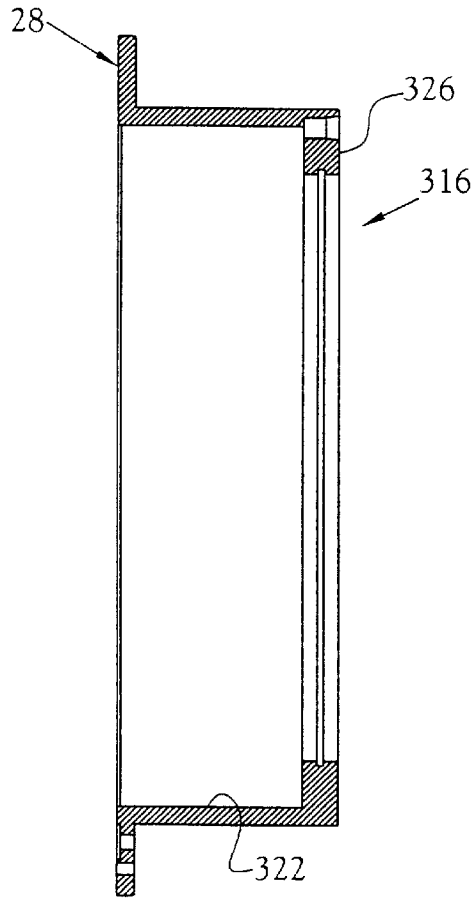
FIG. 22 is a sectional view of the bead lock housing depicted in FIG. 21 and taken generally along line 22—22 of FIG. 21.
Figure 23:
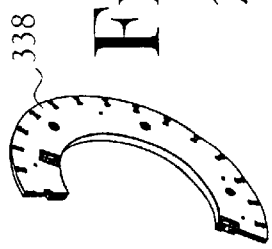
FIG. 23 is a partial perspective view of a profile ring support as employed in a drum of the present invention.
Figure 24:
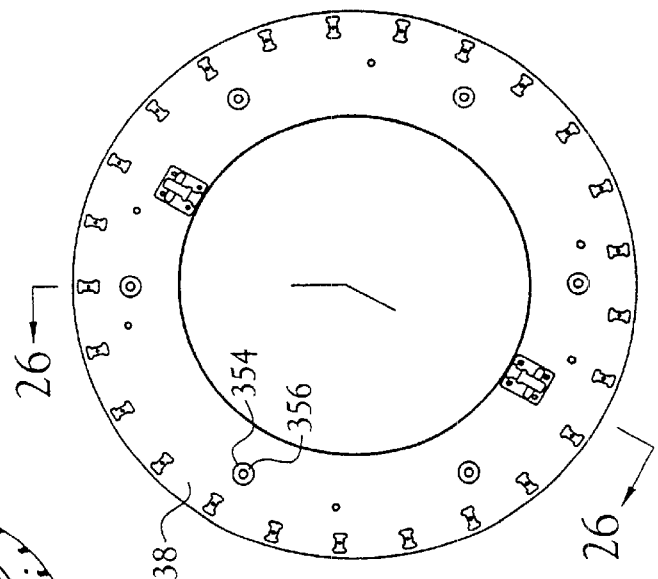
FIG. 24 is a partial perspective view of the profile ring support depicted in FIG. 23 as viewed from the opposite side thereof.
Figure 25:
FIG. 25 is a side elevational view of the profile ring support as depicted in FIG. 24.
Figure 26:
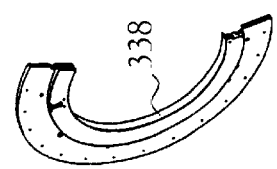
FIG. 26 is a sectional view of the profile ring support as depicted in FIG. 25 and taken generally along line 26—26 of FIG. 25.
Figure 27:
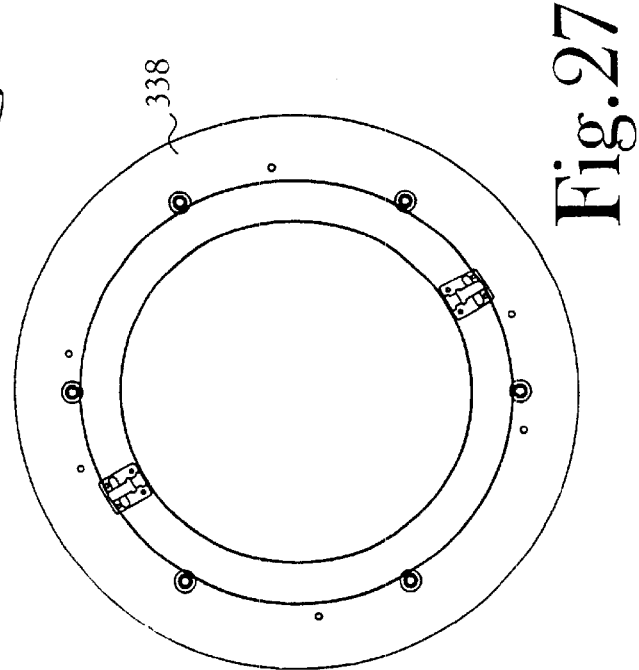
FIG. 27 is a side elevational view of the profile ring support as depicted in FIG. 23.
Figure 30:
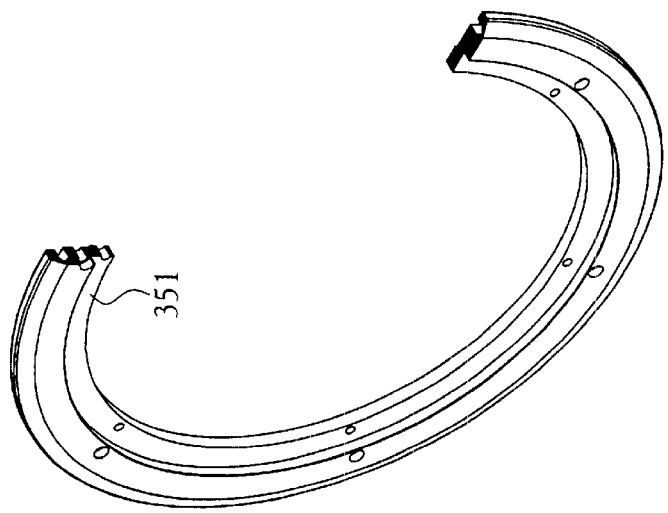
FIG. 30 is a partial sectional view of an inside bladder clamp as employed in a drum of the present invention.

The ramp is mounted within the interior of the drum by means of an ring-type planar ramp support 218 as depicted in FIGS. 2,20 and 22. As depicted, the internal diametral edge 220 of the ramp support 218 engages and is secured to the external diametral edge 222 of the ramp support and extends therefrom toward the central drive shaft 14 of the drum. The internal diametral edge 224 of the ramp support is received by and secured to the axially inward end 226 of a main piston member 228 so that the ramp is movable axially of the drum upon axial movement of the main piston member 228.

Figure 14:
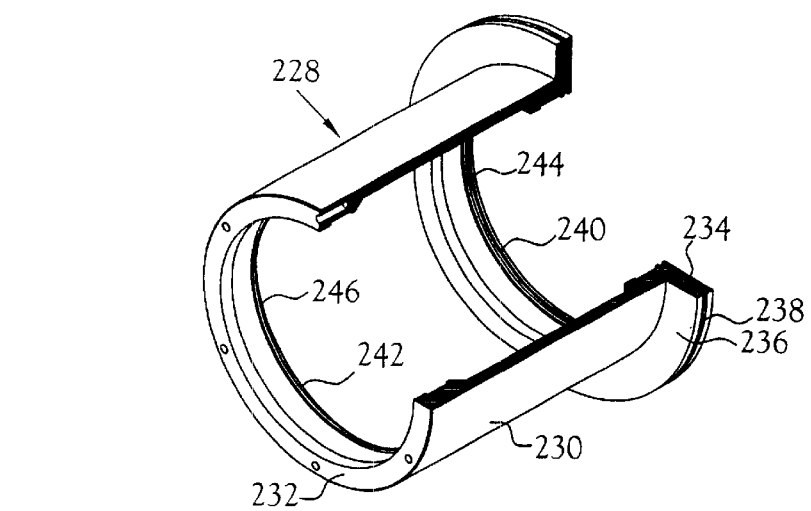
FIG. 14 is a partial perspective view of a main piston as employed in a drum of the present invention.
Figure 15:
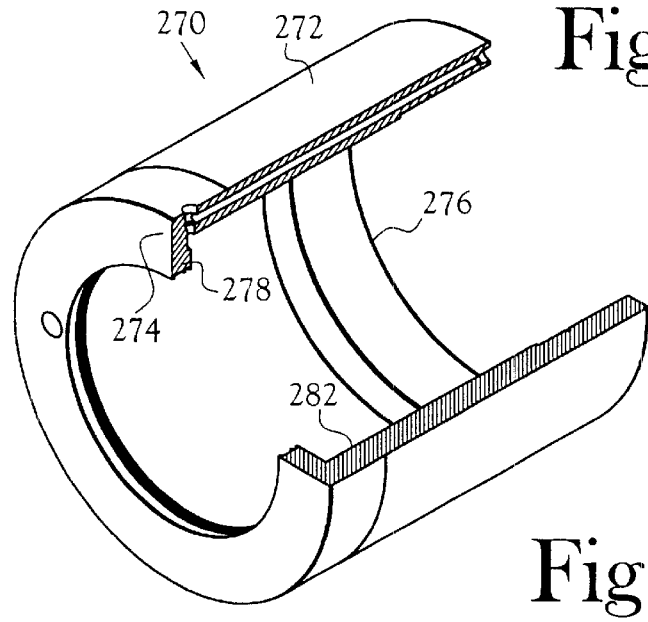
FIG. 15 is a partial perspective view of a main piston housing as employed in a drum of the present invention.

As depicted in FIGS. 2 and 14–15, the main piston member 228 includes a hollow cylindrical body portion 230, a first end 232 and a second end 234. A radial flange 236 is provided in encircling relationship to the second end 234 of the piston member and includes a seal 238 mounted in the outboard edge of the flange. Like seals 240,242 are provided on the inner diametral edges 244,246 of the first and second ends 234,236 respectively, of the body portion 230.

Figure 16:
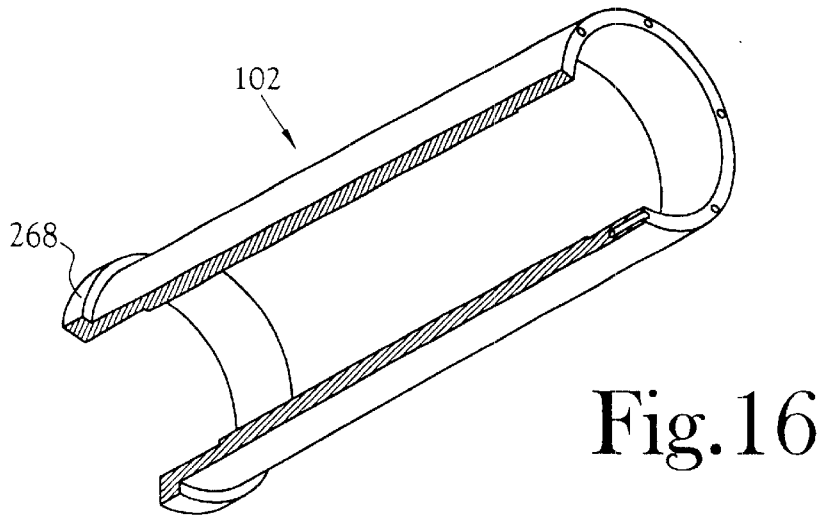
FIG. 16 is a partial perspective view of a slide element as employed in a drum of the present invention.
Figure 18:
FIG. 18 is a sectional view of the cylinder head depicted in FIG. 17 and taken generally along line 18—18 of FIG. 17.
Figure 17:
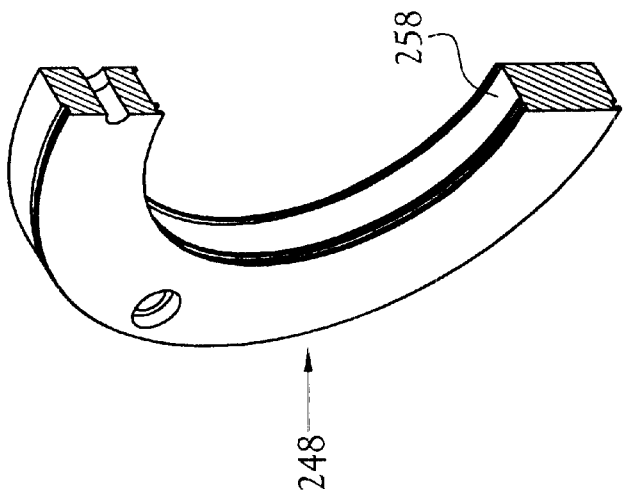
FIG. 17 is a partial perspective view of a cylinder head for the main piston as employed in a drum of the present invention.

This main piston member encircles the slide 102 (FIG. 16) and is slidable along a portion of the length of this slide. As noted, the opposite ends 232,234 of the main piston member include seals 240,242 which are disposed between the main piston member and the outer circumference 250 of the slide, thereby providing a fluid-tight relationship between the main piston member and the slide. With reference to FIGS. 2 and 17,18, there is further provided a cylinder head 248 comprising a solid ring, which is disposed in encircling relationship to the slide 102 at a location outboard of the second end 234 of the main piston member. This cylinder head is provided with a first seal 252 which is disposed along the outer circumference of the cylinder head 248 so that the cylinder head is in sliding sealing engagement with the outer circumference of the slide 102. A second seal 256 is disposed on the inner circumference 258 of the cylinder head. When mounted on the slide 102, the axially inboard surface 260 of the cylinder head faces the axially outboard surface 262 of the flange 236 of the main piston member. A fluid inlet port 264 extends through the thickness of the cylinder head to provide for the introduction of pressurized fluid into the space between the outboard surface 262 of the flange and the axially inboard surface 260 of the cylinder head. As will be noted, such pressurized fluid serves to slide the cylinder head axially outwardly of the drum (to the right as viewed in FIG. 2). This axially outward movement of the cylinder head is limited as by means of a radial flange 268 provided on the outboard end of the slide 102. Once the cylinder head has reached its outboard limit of movement, further introduction of fluidized pressure via the inlet port serves to urge the main piston member to the left as viewed in FIG. 2.

As best seen in FIGS. 2 and 14,15, the main piston member is housed within a tubular housing 270 which encircles the main piston member radially outwardly of the main piston member. This housing is provided with a central body portion 272 having first and second ends 274,276, respectively. A radial flange 278 provided at the first end 274 of the housing projects radially toward the first end 226 of the main piston member. A sliding seal 280 is provided about the outer circumference of the flange 278 to provide a fluid-tight seal between the outer circumference of the flange and the inner circumference of the main piston member. The outboard end 276 of the housing further encircles the cylinder head 248 with the outer rim 271 of the axially inboard surface 260 of the cylinder head 248 engaging a radial shoulder 282 on the inner wall 284 of the housing and anchored thereto as by a locking ring 286 which is held in place as by a bolt 288. Thus, any axial movement of the cylinder head 248 results in like axial movement of the housing 270. Further, the axially outboard end 276 of the housing 270 is provided with an inlet port 290 which is connected to a source of pressurized fluid (not shown). A fluid conduit 292 interconnects the inlet port 290 with the cylindrical cavity 294 defined between the main piston member and its housing, this conduit preferably being in fluid communication with the axially inboard end of such space. By reason of the interlocking of the cylinder head with the housing, upon the introduction of pressurized fluid into space between the surfaces 260 and 262 of the flange 236 of the main piston and the cylinder head 248, the cylinder head is driven to the right as viewed in FIG. 2 to move therewith the housing 270. As will appear more fully hereinafter, the housing 270 carries various sub-components of the drum so that axial movement of the housing results in simultaneous and like axial movement of these subcomponents of the drum. This movement of the housing assumes that there is a lesser or no pressurized fluid being admitted to the annular cavity 294 between the main piston member 228 and its housing 270 via the port 290. To the contrary, when the pressure within the annular cavity 294 between the main piston member and its housing is increased to overcome any pressure which may exist between the surfaces 260 and 262 of the flange and cylinder head, and because of the interlocking of the cylinder head and the housing 270, the housing 270 is caused to move axially to the left as viewed in FIG. 2, thereby returning the aforementioned subcomponents toward their most axially inward positions.

Figure 19:
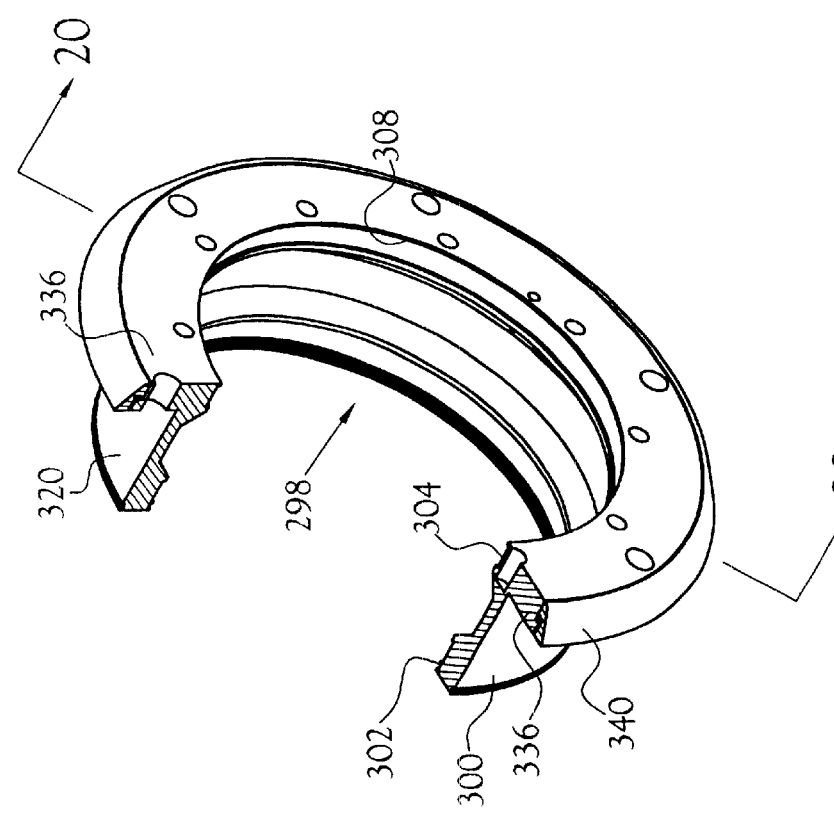
FIG. 19 is a partial perspective view of a bead lock piston as employed in a drum of the present invention.
Figure 21:
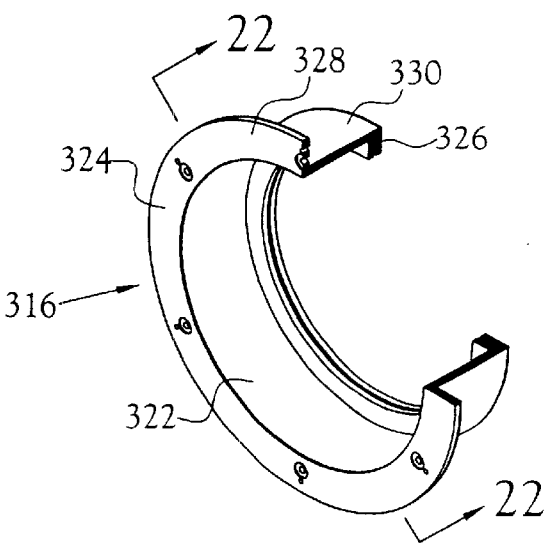
FIG. 21 is a partial perspective view of a bead lock piston housing as employed in a drum of the present invention.

Referring specifically to FIG. 2, in the depicted embodiment of the present drum, there is mounted on the outer circumference 296 of the housing 270 for the main piston member a subassembly for effecting various of the desired functions of the present drum. Specifically, this subassembly includes an annular bead lock piston 298 which encircles the outer circumference 296 of the housing 270. Referring also to FIGS. 19,20, this bead lock piston 298 includes a body portion 300 and first and second ends 302 and 304. The inner circumferences 306,308 of each of these first and second ends is provided with sliding seals 310 and 312, respectively, thereby defining, in combination with the body portion of the bead lock piston, a fluid-tight annular chamber 314 between the outer circumference of the housing and the inner circumference of the bead lock piston.

The bead lock piston is held in position partly by an annular housing 316 which encircles the bead lock piston 298. A sliding seal 318 is disposed between the outer circumference 320 of the bead lock piston and the inner circumference 322 of the housing. The housing includes first and second ends 324,326, the first end 324 of which defines a radial flange 328 which extends radially from the first end of the housing toward the outer circumference 330 of the housing 316 for the main piston member and terminates in sliding engagement with such outer circumference of the housing. This flange further closes the axially outboard end 324 of the bead lock piston housing to define an annular fluid-tight cavity 332 between the outboard first end 302 of the bead lock piston 298, the outer circumference 330 of the housing 270 for the main piston member 228 and the body portion 300 of the bead lock piston housing 316. An inlet port 334 is provided in fluid communication between a source of pressurized fluid (not shown) and the annular cavity 322 so that upon the introduction of pressurized fluid into the annular cavity 332 via the port 334, the bead lock piston 298 is urged to the left as viewed in FIG. 2. Release of such pressurized fluid permits travel of the bead lock piston to the right as viewed in FIG. 2.

The first end 302 of the bead lock piston 298 is provided with a radial flange 336 which projects radially outwardly from the bead lock piston . This flange serves to mount to the bead lock piston an annular profile ring support 338 (see FIGS. 2, 23–27). Further the flange 336 serves to mount thereon an annular cam 340. Flange 336 serves to mount thereon a first mounting ring 351, a spacer ring 353 and a second mounting ring 355 for an annular bladder 357 which is employed to overlap the end 352 of a partially formed tire carcass about a bead ring 350 which is disposed adjacent one edge of the bladder as best seen in FIG. 2 and as is well known in the art. An inlet port for introducing pressurized fluid into the bladder for inflation, and for subsequent deflation thereof, is provided in fluid communication with the interior of the bladder through a fluid conduit 359. As desired, an exhaust muffler may be provided in the conduit for reducing noise generated by deflation of the bladder upon completion of its overfolding function.

The flange 336 is provided with a plurality of open bores 354 radially spaced about the flange and extending through the thickness therefor for the receipt therein of respective tubular spacers 356. The fit of each spacer within its respective bore is such as permits sliding axial movement of the flange relative to the spacers. An annular seal 358 is interposed between the outer circumference of each spacer and the inner circumference of a respective bore to provide fluid-tight sealing therebetween.

One end of each tubular spacer 356 is received in a depression in the inboard face of the annular flange of the bead lock piston housing and anchored therein as by a bolt 360. The opposite end of the spacer is received in a depression in the outboard face of the annular profile ring support 338 (see FIGS. 2, 25–27) and is anchored therein as by a bolt 362.

In the annular space between the flange 336 and the profile support ring 338 there are mounted a plurality of bead lock shoes 400. (see FIGS. 2, 35–38). As depicted in FIGS. 35–38, each shoe includes a body portion 402 whose opposite sides 404 and 406 abut with and are aligned in an annular geometry with others of the shoes to define the bead lock ring 410. With reference also to FIGS. 2 and 23–27, each shoe is mounted for radial slidable movement with respect to the profile support ring 338 as by a key (not shown) which resides in a respective radial slot 412 in the outboard surface of the profile support ring 338 as by means of a bolt which extends through a further radial elongated slot 414 in the body portion of the shoe and which extends through the key in its radial slot, thence to be anchored in the profile support ring. In this manner, each shoe is mounted for slidable movement radially of the drum. In the aggregate, the plurality of shoes define first and second annular recesses 416, 418, each of which receives therein a portion of the expandable bladder 357 (see FIG. 2). As depicted in FIG. 2, the first portion of the bladder disposed within the annular recess 416 engages the bead ring and is captured between the bead ring and the annular recess defined by the shoes, thereby locking the bead ring to the shoes when the shoes are expanded radially.

Figure 28:
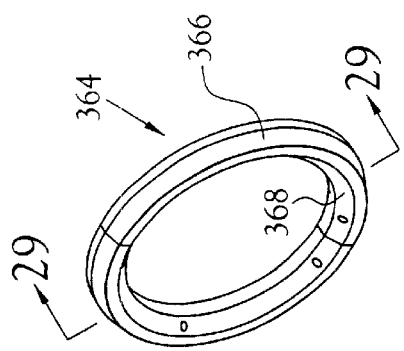
FIG. 28 is a perspective view of an annular profile ring as employed in the present invention.
Figure 29:
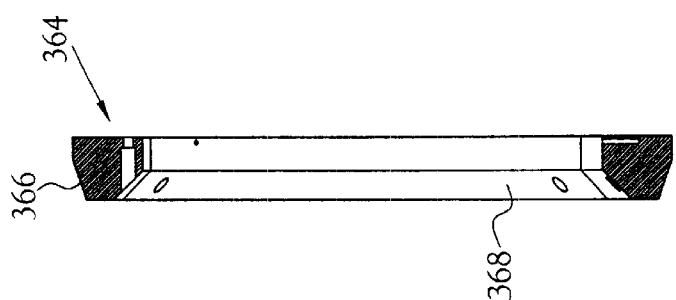
FIG. 29 is a side elevation sectional view of the profile ring depicted in FIG. 28 and taken generally along the line 29—29 of FIG. 28.
Figure 32:
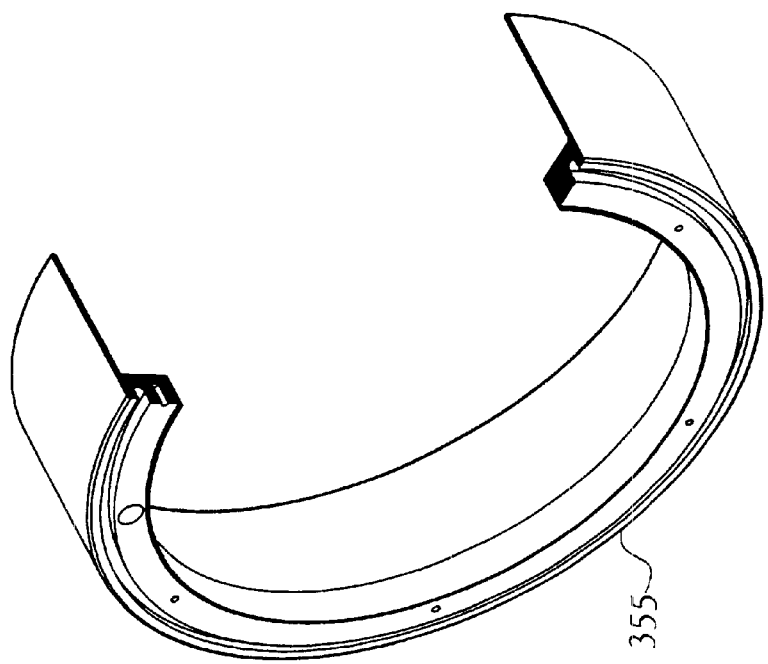
FIG. 32 is a perspective view of a outer bladder support as employed in a drum of the present invention.
Figure 31:
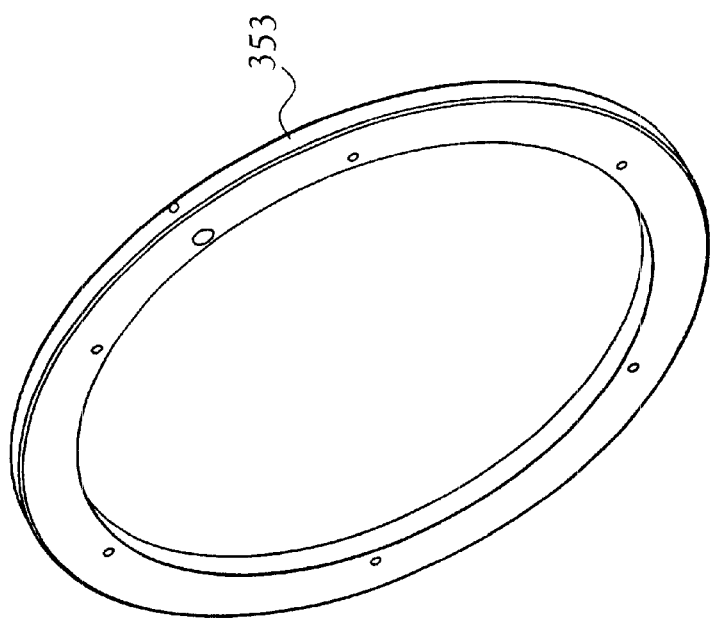
FIG. 31 is a perspective view of a center bladder clamp as employed in a drum of the present invention.
Figure 33:
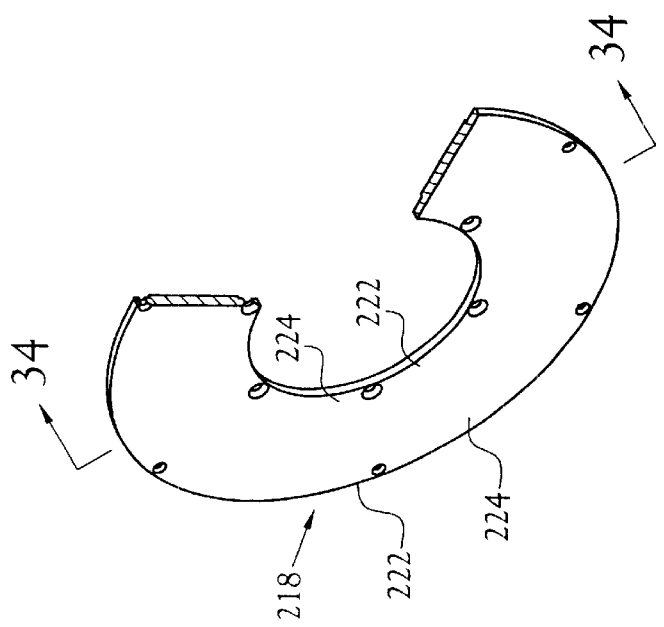
FIG. 33 is a partial perspective view of a ramp support as employed in a drum of the present invention.
Figure 34:
FIG. 34 is a sectional view of the ramp support depicted in FIG. 33 and taken generally along the line 34—34 of FIG. 33.

As seen in FIGS. 2, 28–29, a profile ring 364 is mounted on the inboard face of the profile support ring 338. This profile ring includes an annular cam surface 366, which projects axially and radially inwardly of the drum and is positioned to be engaged in camming relationship with the respective third cam rollers 152 of the plurality of segment carriers 136. This profile ring 364 is fixedly mounted to the profile support ring 338, hence its axial motion can serve to limit the axial movement of the second subsystem. Such axial movement of the profile ring is a function of the position of the third roller cams 150 which engage the camming surface of the profile ring, with the further feature that the most axially inwardly limit of travel of the profile ring is established upon contact of notch 369 in the outboard end of each of the segment carriers 136 with an annular bumper 371 which is mounted on the outer circumference of the inboard mounting ring 351 for the bladder 357 of the drum. This limit is further established by the engagement of the camming surface 368 of the profile ring with the camming surface 214 of the annular ramp 200. As depicted in FIG. 2, the profile ring is positioned at its most axially inwardly limit of travel. In this position of the profile ring, first, the third roller cams 152 are in camming engagement with the camming surface 366 of the profile ring and, second, the first and second roller cams 144 and 150 of the plurality of segment carriers are each positioned at their most outward radial positions. That is, the first and second roller cams 144,150 of each of the carrier segments are disposed within respective concavities 370,372 on the radially outward rims of the annular projections 208,210 of the annular ramp 200. When so positioned, the carrier segments are locked against radially inward movement thereof, thereby locking the segments and the carcass carried thereon in the desired radially expanded state. Further, in the position of the roller cams and the camming surfaces associated with these cams as depicted in FIG. 2, the bead lock subassembly is disposed at its most axially inward position, thereby positioning the bead ring locked to this subassembly at its most axially inward position relative to the central subsystem 15.

To ensure that the profile ring, hence the second subsystem 13 does not move axially outwardly of the drum, hence move the bead rings out of their desired positions relative to the expanded carcass, there is provided a lever arm 374 pivotally mounted in the profile support ring and projecting therefrom to define a locking lug 376 on the outboard end thereof which is adapted to releasably engage a locking slot 378 provided in the inner circumference of the annular ramp 200. Spring biasing of the lever arm is provided for by means of a spring-loaded pin 380 disposed within a housing that is, in turn, mounted in the profile ring in position to engage a radially extending projection 384 on the lever arm adjacent its pivot point 386. Spring biasing of the lever arm away from its locking position with the annular ramp is provided in the depicted embodiment as by a spring pin 388 which is mounted in the profile ring. In function, movement of the bead lock piston axially inwardly of the drum serves to bias the locking lever into locking engagement with the annular ring when the second subsystem is in its most axially inward position. The second subsystem, therefore, becomes, and remains, a composite, rigidly connected, part of the overall drum until the locking lever is released. Release of the locking lever occurs when the bead lock piston is moved axially outwardly of the drum in the course of release of the bead ring, thereby moving the biasing pin 380 away from the locking lever, whereupon the biasing force of the pin 388 against the locking lever moves the locking lever out of engagement with the annular ramp 200 to allow full axial withdrawal of the second subsystem from the first subsystem, leaving the carcass and its bead rings on the radially expanded segments.

Recalling that the annular ramp 200 is movable axially of the drum by the reciprocatory action of the main piston, when the pressure within the cavity of the main piston is sufficiently great, the annular ramp 200 is urged axially outwardly of the drum, thereby establishing camming engagement of the first and second cam rollers 144,158 of the each of the plurality of segment carriers 136 with the cam surfaces 214,216 of the annular ramp 200, hence radial movement of the plurality of carrier segments, and resultant adjustment of the outer circumference of the drum, as a function of the direction and extent of axial movement of the main piston. This action effects radial expansion of the carcass. To form the sidewalls of the carcass, the present inventor provides for simultaneous axially inward movement of the bead rings as the carcass is radially expanded so that the bead rings ultimately are positioned radially inwardly of the outboard ends of the segments, causing that portion of the carcass between the rims of the segments and the bead rings to define the sidewalls of the tire.

Figure 4:
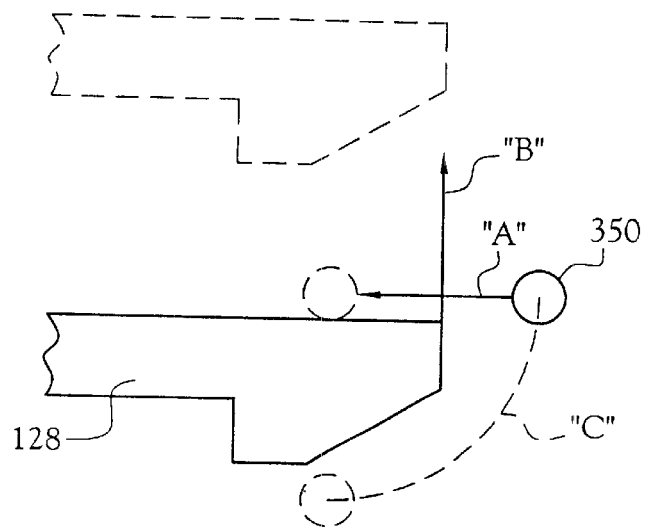
FIG. 4 is a schematic representation of the relative movement of a locked bead ring relative to the circumference defining segments of a drum of the present invention.
Figure 5:
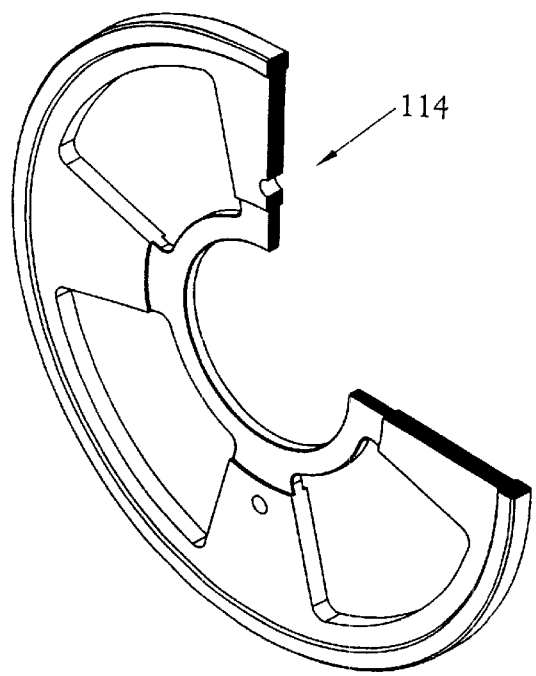
FIG. 5 is a perspective view of a timing plate as employed in a drum of the present invention.
Figure 6:
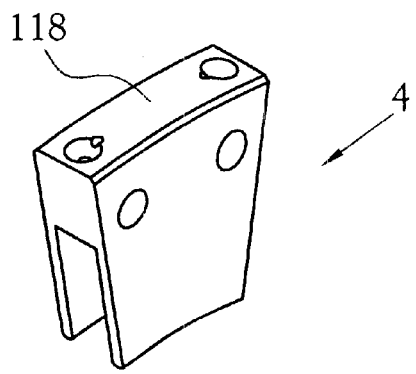
FIG. 6 is a perspective view of a gap shield support bracket as employed in a drum of the present invention.
Figure 7:
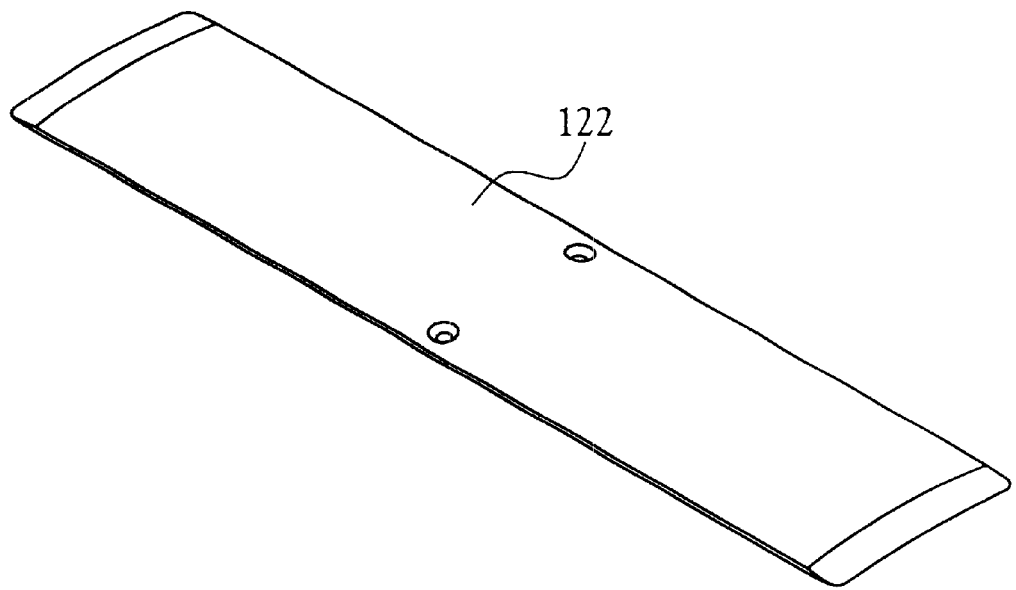
FIG. 7 is a perspective view of a gap shield as employed in a drum of the present invention.
Figure 10:
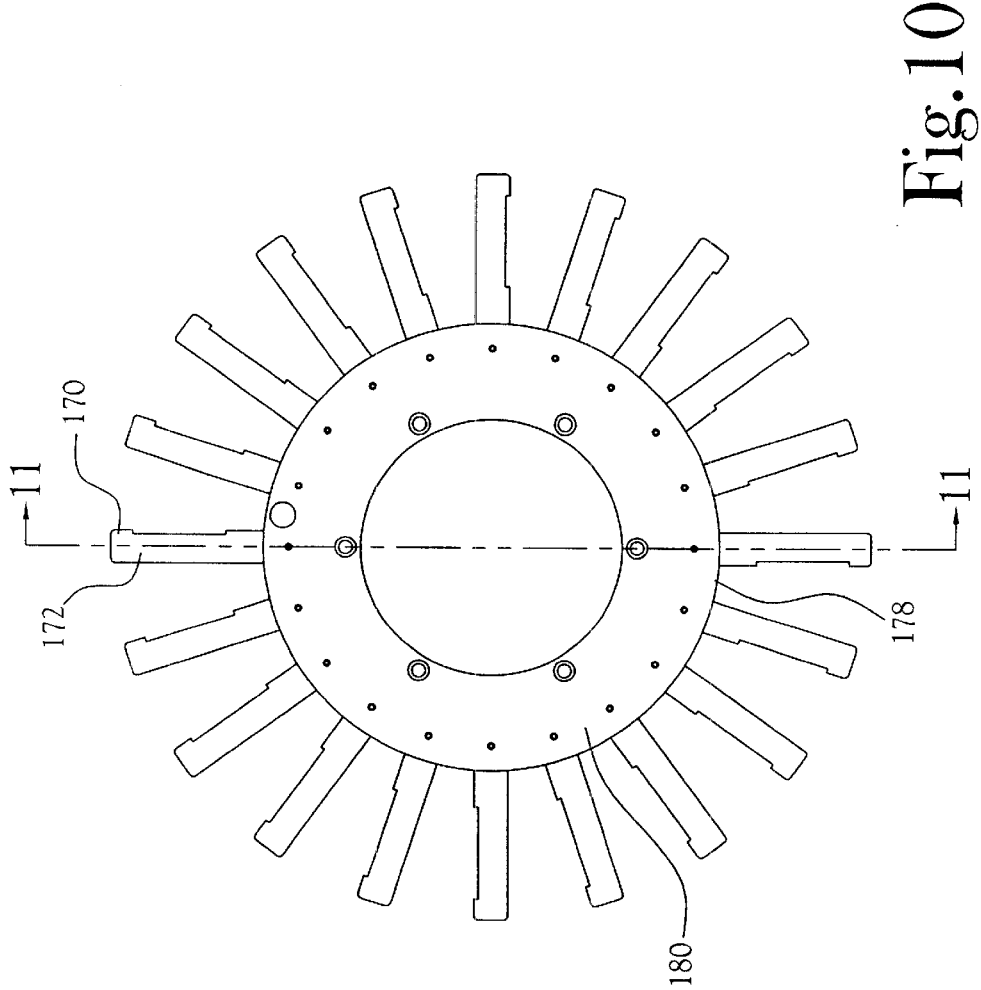
FIG. 10 is a side elevation view of a guide plate subassembly as employed in a drum of the present invention.
Figure 11:
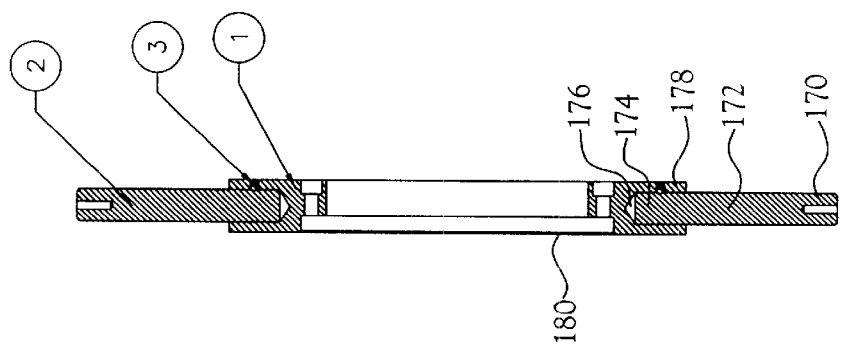
FIG. 11 is a sectional view of the guide plate of FIG. 10 and taken generally along the line 11—11 of FIG. 10.

FIGS. 3A, 3B, 3C, 3D, 3E and 3F sequentially depict the movements of the drum segments 128 and the simultaneous axial movement of a bead ring 350 as the segments are moved radially outwardly of the drum to expand the carcass. Referring also to FIG. 4, notably, the simultaneous movements of the segments and the bead ring cause the bead ring to move axially inwardly of the drum along a straight path "A" and the outboard rim of each segment to move only radially outwardly of the drum, also along a straight (radial) path "B". However, the resultant of these two simultaneous movements is a continuous and smooth curved path (dash line "C") of the bead ring and the rim of the segment with respect to one another. This path of movement is important in the bending and stretching of the carcass in that this resultant curved path has been found to avoid wrinkles, uneven stretching, severe bends, and/or like deleterious movements of the carcass as it is expanded and the opposite ends thereof are formed into the sidewalls of the tire. This feature is of particular importance in the fabrication of "radial" or "biased" tire carcasses.

As referred to hereinabove, and as may be seen in FIG. 2, when the segment carriers are disposed in their most radially outward limit of movement away from the drum axis, the roller cams 144,150 are "locked" in their respective concavities. Once this locking has been accomplished, release of the forces urging the bead locks radially outward of the drum and consequential release of the bead rings, accompanied by axially outwardly movement of the second subsystem, has no effect on the positions of the carrier segments. Rather, the carrier segments remain locked in their radially outward status, thereby retaining the expanded condition of the carcass.

It will be recognized that once the second subsystem of the drum has been moved fully axially outwardly from the central subsystem of the drum, there is provided space between these subsystems for performing stitching operations or the like upon the outer surfaces of the sidewalls of the carcass.

In the depicted embodiment of the present invention, the several segment carriers are biased radially inwardly of the drum as by means of at least one elastic band which encircles the plurality of segments, such as elastic band 186 which encircles the inboard ends 162 of the plurality of carrier segments, and an elastic band which encircles the outboard ends of the carrier segments and further defines a rounded outboard edge of these segments. In the present invention, once the carcass has been expanded and all desired work thereon has been completed, the pressure within the cavity 260 adjacent the outboard end of the main piston is increased to move the annular ramp 200 axially inwardly of the drum, thereby permitting the first and second roller cams to move radially inwardly along the cam surfaces 214, 216. The radially inward bias of the carrier segments thereupon causes the carrier segments, hence the drum segments, to move radially inwardly a distance sufficient to reduce the circumference of the drum to that value which will permit withdrawal of the formed carcass, with its formed sidewalls, from the drum.

As noted, FIG. 2 is taken generally along the lines 2—2 of FIG. 1. Referring to FIG. 1, it will be noted that FIG. 2 represents a cross section of the top right-hand quadrant (approximately) of the drum. The top left-hand quadrant of the drum, as depicted in FIG. 1, is substantially a mirror image of the depicted top right-hand quadrant. In FIG. 1, various of the components of the drum are depicted as being located in different cross-sectional locations about the axis of the drum, but the bottom right-hand quadrant of FIG. 1 is substantially identical to the top right-hand quadrant of FIG. 1, and the bottom left-hand quadrant of FIG. 1 is substantially identical to the top left-hand quadrant of FIG. 1.

As noted hereinabove, the drum is defined by substantially like halves. However, the left and right-hand halves of the drum depicted in FIG. 1 are at least partly independently operable as respects their rotational alignment about the central axis of the drum. To ensure coordinated and registered relationship between the drum halves in the course of the functioning of the drum, the present inventor provides a central alignment subsystem which effectively interconnects the two halves of the drum to one another while accommodating the radial movement of the segments of the drum in the course of altering the overall outer circumference of the drum.

This alignment subsystem comprises the timing plate 114 which is disposed at its inner circumference within the annular groove defined in the annular collar 94 and in at its outer circumference 116 within the annular grooves of the several gap shield brackets 118. As depicted in the bottom half of FIG. 1, there is provided a first shaft 400 which extends through the thickness of the timing plate 114 at a location adjacent the inner circumference of the plate. The opposite ends of this shaft project from the opposite faces of the timing plate to receive thereon respective first and second knuckle connectors 404, 406. The outboard end of each knuckle connector is internally threaded to receive therein the externally threaded first end of a respective one of first and second adjustment rods 405, 410.

A first stub shaft 412 is anchored in a first one of the segment carriers that is disposed within the first half of the drum, and projects toward the timing plate but ends short of the plate. The outboard end of this first stub shaft is provided with a third knuckle connector 414 whose outboard end is internally threaded to receive therein the second and opposite end of the first alignment rod 408. As desired, a locking nut may be threaded onto the second end of the alignment rod for securing the alignment rod against rotation thereof after the effective length of the first alignment rod between the first and third knuckles 404, 414 has been established. A second stub shaft 416 is provided in a second one of the segment carriers which is disposed within the second half of the drum, in spatially opposed relationship to the first stub shaft, and projects therefrom toward the alignment plate, but ends short of the plate. The outboard end of this second stub shaft is provided with a fourth knuckle 418 connector whose outboard end is internally threaded to receive therein the second and opposite end of the second alignment rod 410. This second rod may also be provided with a locking nut. By this described and depicted means, the first and second segment carriers are interconnected to one another through the first and second alignment rods and at a radially fixed location on the alignment plate. Through adjustment of the length of the first and second alignment rods, the radial distance of each of the segment carriers which are connected to the rods is selectable, and is initially selected to be equal so that any radial movement of either of the segment carriers will result in like radial movement of the other of the interconnected segment carriers. Recalling that all of the segment carriers of each half of the drum are interconnected on to another through their respective radial flange 180, any radial movement of either of the first or second segment carriers which are interconnected with one another through the alignment plate, will result in like radial movement of all of the segment carriers of the first half of the drum and all of the segment carriers of the second half of the drum. In a preferred embodiment, a second, and like, alignment rod interconnection assembly of segment carriers through the alignment plate is provided at a location approximately 180 degrees about the drum from the first alignment rod interconnection described above. Such second alignment rod interconnection is not depicted in the Figures, but its construction and function will be recognized by a person skilled in the art, given the description provided herein of the structure and operation of the first alignment rod interconnection. Through the means of these alignment rod interconnections, there is provided synchronous radial movement of all of the segment carriers of the drum, irrespective of which half of the drum they are associated with.

A controller 430 is provided for selecting and controlling the admission and exhaust of pressurized air to and from the several ports illustrated in the accompanying drawings.

As noted hereinbefore, in the depicted embodiment of the present invention, there is provided a resilient band 190 which encircles each rim of the drum. Recalling that the circumference of the drum is defined by a plurality of segments, it will be recognized that upon radial expansion of the circumference of the drum there develop gaps between adjacent ones of the segments. These gaps extend to the rim at respective ends of the drum. When forming a carcass on a drum where the gaps are present, the carcass which encircles the drum and whose opposite ends extend beyond the rims of the drum, tends to enter into the gaps between segments, creating very undesirable unevenness of the carcass at the location where the body of the carcass transitions into the side walls of the tire. In the present invention, it has been found that this problem can be solved by placing a resilient, such as resilient urethane, band about the circumference of each rim of the drum, such band defining the outermost edge of the rim. This band has been found to effectively bridge the gaps between the circumference-defining segments of the drum plus provide a "rounded" edge, partly as a result of compression of the resilient band as the end of the carcass is moved radially outwardly of the drum as the drum is expanded and the bead ring is moved axially inwardly of the drum, which aids in preventing non-uniform distortion of the carcass in the course of the formation of the sidewalls.

Whereas the present invention has been described in detail with reference to the drawings, it is intended that the invention be limited only as set forth in the claims appended hereto.

What is claimed is:

1. A drum for the formation of a vehicle tire carcass including bead positioning features, the drum including a central axial shaft defining a rotational axis of the drum and a central transverse center plane dividing the drum into substantially identical end portions, comprising a plurality of segments collectively defining an outer circumference of the drum, each of said segments including an outboard end and the outboard ends of said segments collectively defining outboard rims of the drum, first and second subsystems, one of which is disposed on each of the opposite sides of the central transverse center plane of the drum, said first and second subsystems each including means for locking engagement of each of said first and second subsystems with a respective bead ring adjacent a respective one of the opposite ends of a carcass disposed on the drum, and at least one camming surface, third and fourth subsystems one of which is disposed on each of the opposite sides of the central transverse plane of the drum, and including means for radial adjustment of the outer circumference of the drum, each of said third and fourth subsystems comprising a main piston element disposed within the drum in position for axial movement of said main piston element, at least one annular ramp affixed to said main piston element for axial movement thereof upon axial movement of said main piston element and defining at least one camming surface which is oriented radially outwardly and axially inwardly of said axial shaft, a plurality of segment carriers operatively interposed between said at least one annular ramp and said segments, each of said plurality of segment carriers including a cam follower element disposed in operative relationship to said at least one camming surface defined by said ramp to move said segments radially outwardly of the drum in response to operative movement of said main piston element in a direction axially of the drum, and a further cam follower disposed on each of said segments in position to operatively engage said camming surface associated with a respective one of said first and second subsystems.

2. The drum of claim 1 wherein each of said first and second subsystems comprises a bead lock piston element disposed within the drum in position for axial movement of said bead lock piston element, a plurality of bead lock shoes disposed in encircling relationship to said axial shaft, each of said bead lock shoes defining a camming surface directed generally radially and axially outwardly of said axial shaft, a bead lock ring interposed between said bead lock piston element and said plurality of bead lock shoes, said bead lock ring including a camming surface which is operatively engageable with said camming surface defined by said plurality of bead lock shoes for the radial movement of said bead lock shoes upon axial movement of said bead lock ring, said bead lock ring being axially moveable upon axial movement of said bead lock piston element, and an annular profile ring associated with said bead lock piston for axial movement thereof in response to axial movement of said bead lock piston element and defining a camming surface disposed in operative relationship to said further cam followers disposed on each of said segment carriers whereby radial movement of said cam followers disposed on said segment carriers combines with axial movement of said profile ring to define a resultant substantially smooth curved path of travel of each of said outboard rims of the drum relative to their respective bead rings.

3. The drum of claim 1 wherein said plurality of segments comprise two sets of segments, one set defining one end of the drum and the other set defining an opposite end of the drum.

4. The drum of claim 2 wherein said main piston element and said bead lock piston element are independently operable.

5. The drum of claim 4 and including a controller capable of supplying pressurized fluid to each of said main piston element and said bead lock piston element at selected pressures and selected times in the course of operation of the drum for forming a vehicle tire carcass disposed on the circumference of the drum.

6. The drum of claim 1 wherein said first and second subsystems are disposed on opposite sides of said transverse center plane of the drum, said first and second subsystems being substantially mirror images of one another.

7. The drum of claim 6 and including means disposed between said first and second subsystems and adjacent the transverse center plane interconnecting said first and second subsystems against rotational movement relative to one another about said central axial shaft.

8. The drum of claim 7 wherein said means includes an annular timing plate rotatably mounted on said central axial shaft and extending therefrom in a plane substantially parallel to said central transverse center plane of the drum, a first rigid arm having first and second opposite ends, said first end being pivotally mounted to one side of said timing plate at a location adjacent the inner circumferential margin thereof and extending therefrom to a location adjacent said outer circumference of the drum, said second end being pivotally mounted to said first subsystem at a location adjacent said circumference of the drum to thereby interconnect said timing plate to said first subsystem, a second rigid arm having first and second opposite ends, said first end being mounted to the opposite side of said timing plate at the same location, but on the opposite side of, said timing plate as said first end of said first rigid arm and extending therefrom to a location adjacent the outer circumference of the drum, said second end of said second rigid arm being pivotally mounted to said second subsystem at a location adjacent the outer circumference of the drum to thereby interconnect said timing plate to said second subsystem, whereby rotational movement of either of said first and second subsystems relative to said central axial shaft is transmitted to the other of said first and second subsystems.

9. The drum of claim 8 wherein the locations of the attachment of the second ends of said first and second rigid rods to said first and second subsystems are in register with one another across the central transverse center plane of the drum.

10. The drum of claim 9 wherein said locations of attachment of said second end of said first and second rigid rods to said first and second subsystems are disposed non-radially of their respective common location of attachment to said timing plate and separated substantially apart along the circumference of said timing plate from said location of said mounting of said first rigid arm to said timing plate.

11. The drum of claim 8 wherein said drum includes first and second annular guide plates disposed in axially sliding encircling relationship to said central axial shaft, one each of said guide plates being disposed on opposite sides of said central transverse center plane of the drum, and said second end of said first rigid arm is pivotally connected to said first annular guide plate and said second end of said second rigid arm is pivotally connected to said second guide plate.

12. The drum of claim 8 and including third and fourth rigid arms, each having first and second opposite ends, said first and second ends of said third and fourth arms being pivotally mounted to opposite sides of said timing plate at a common location adjacent the inner circumferential margin of said timing plate and which is spaced apart from said common location of attachment of said first and second rigid arms to said timing plate, and extending therefrom to respective locations adjacent said outer circumference of the drum, said second end of said third rigid arm being pivotally mounted to said first subsystem at a location adjacent said circumference of the drum and said second end of said fourth rigid arm being connected to said circumference of the drum at a location adjacent said circumference of the drum to thereby interconnect said timing plate to said first and second subsystems, respectively, said locations of attachment of said second ends of said third and fourth rigid arms being disposed in register with one another on opposite sides of said central transverse center plane of the drum, spaced apart from the registered locations of attachment of said second ends of said first and second rigid arms, and non-radially of their respective common location of attachment to said timing plate, whereby rotational movement of either of said first and second subsystems relative to said central axial shaft is cooperatively transmitted to the other of said first and second subsystems through said first, second, third and fourth rigid arms.

13. The drum of claim 1 and including means biasing said plurality of segment carriers radially inwardly of the drum.

14. The drum of claim 1 and including means for releaseably latching said first and second subsystems together with respective ones of said third and fourth central subsystems against axial movement of either of said first or second subsystem in a direction axially outwardly of the drum.

15. The drum of claim 1 wherein said at least one annular ramp affixed to said main piston element includes a concavity defined in the most radially outward portion thereof and, at the most radially outward limit of said at least one camming surface defined on said segment carrier, said cam follower associated with a segment carrier resides in said concavity.

16. The drum of claim 15 wherein said cam follower disposed on each of said segment carriers is adapted to reside in a respective one of said concavities when the circumference of the drum has been maximized.

17. The drum of claim 1 wherein said axial and radial movements occur substantially simultaneously.

* * * * *